US009081690B2

(12) United States Patent
Araki et al.

(10) Patent No.: US 9,081,690 B2
(45) Date of Patent: *Jul. 14, 2015

(54) STORAGE SYSTEM AND MANAGEMENT METHOD OF CONTROL INFORMATION THEREIN

(71) Applicant: Hitachi, Ltd., Tokyo (JP)

(72) Inventors: Akihiko Araki, Sagamihara (JP); Yusuke Nonaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,197

(22) Filed: Oct. 6, 2014

(65) Prior Publication Data

US 2015/0026395 A1 Jan. 22, 2015

Related U.S. Application Data

(63) Continuation of application No. 14/013,814, filed on Aug. 29, 2013, now Pat. No. 8,880,798, which is a continuation of application No. 13/054,467, filed as application No. PCT/JP2010/007539 on Dec. 27, 2010, now Pat. No. 8,539,150.

(51) Int. Cl.
*G06F 12/00* (2006.01)
*G06F 12/08* (2006.01)
(Continued)

(52) U.S. Cl.
CPC ........ *G06F 12/0871* (2013.01); *G06F 12/0246* (2013.01); *G06F 12/0873* (2013.01); *G06F 12/121* (2013.01); *G06F 2212/1021* (2013.01);
(Continued)

(58) Field of Classification Search
CPC ............ G06F 12/0871; G06F 12/0246; G06F 12/0873; G06F 2212/1021; G06F 2212/222; G06F 2212/262; G06F 2212/466; G06F 2212/282; G06F 2212/7208; G06F 12/121
USPC .................. 711/113, 114, 154, 157, 165, 173
See application file for complete search history.

(56) References Cited

U.S. PATENT DOCUMENTS 6,487,632 B1 11/2002 Nakatani
7,395,402 B2 7/2008 Wilson et al.
(Continued)

FOREIGN PATENT DOCUMENTS

JP 05-074046 3/1993
JP 2001-154894 A 6/2001
(Continued)

OTHER PUBLICATIONS

Non-Final Office Action for U.S. Appl. No. 13/054,467 dated Jan. 29, 2013.
(Continued)

*Primary Examiner* — John Lane
(74) *Attorney, Agent, or Firm* — Foley & Lardner LLP

(57) ABSTRACT

An embodiment of this invention divides a cache memory of a storage system into a plurality of partitions and information in one or more of the partitions is composed of data different from user data and including control information. The storage system dynamically swaps data between an LU storing control information and a cache partition. Through this configuration, in a storage system having an upper limit in the capacity of the cache memory, a large amount of control information can be used while access performance to control information is kept.

20 Claims, 25 Drawing Sheets

(51) Int. Cl.
*G06F 12/02* (2006.01)
*G06F 12/12* (2006.01)

(52) U.S. Cl.
CPC ..... *G06F 2212/222* (2013.01); *G06F 2212/262* (2013.01); *G06F 2212/282* (2013.01); *G06F 2212/466* (2013.01); *G06F 2212/7208* (2013.01)

(56) References Cited

U.S. PATENT DOCUMENTS

| | | | |
|---|---|---|---|
| 7,818,501 | B2 | 10/2010 | Hyde et al. |
| 2008/0082745 | A1 | 4/2008 | Takada et al. |
| 2010/0082558 | A1 | 4/2010 | Anglin et al. |
| 2011/0197023 | A1 | 8/2011 | Iwamitsu et al. |
| 2011/0202743 | A1 | 8/2011 | Kaneda |
| 2012/0042141 | A1 | 2/2012 | Tatara et al. |

FOREIGN PATENT DOCUMENTS

| | | |
|---|---|---|
| JP | 2004-030090 | 1/2004 |
| WO | WO-2010/106574 A1 | 9/2010 |

OTHER PUBLICATIONS

Non-Final Office Action on U.S. Appl. No. 14/013,814 dated Mar. 24, 2014.
Notice of Allowance for U.S. Appl. No. 13/054,467 dated May 7, 2013.
Notice of Allowance for U.S. Appl. No. 14/013,814 dated Jul. 7, 2014.
PCT International Search Report and Written Opinion on application No. PCT/JP2010/007539 mailed Nov. 8, 2011; 9 pages.

PARTITION ALLOCATION MANAGEMENT TABLE (120)

| PARTITION NO. (121) | SEGMENT SIZE [KB] (122) | CAPACITY [MB] (123) | ALLOCATED LU NO. (124) | RESIDENT FLAG (125) | CONTROL INFORMATION ALLOCATION FLAG (126) |
|---|---|---|---|---|---|
| 0 | 16 | 600 | 0,1,2 | 0 | 0 |
| 1 | 16 | 1000 | 10 | 0 | 1 |
| 2 | 4 | 500 | 21 | 1 | 1 |
| 3 | 256 | 600 | - | - | - |
| ⋮ | ⋮ | ⋮ | ⋮ | ⋮ | ⋮ |

Fig. 7

LU MANAGEMENT TABLE (130)

| LU NO. (131) | CAPACITY [GB] (132) | ALLOCATED PARTITION NO. (133) | STORED DATA CATEGORY (134) |
|---|---|---|---|
| 0 | 60 | 0 | USER DATA |
| 1 | 60 | 0 | USER DATA |
| 2 | 60 | 0 | USER DATA |
| 10 | 100 | 1 | CONTROL INFORMATION |
| 21 | 500 | 2 | CONTROL INFORMATION |
| ⋮ | ⋮ | ⋮ | ⋮ |

Fig. 18

LU MANAGEMENT TABLE (180)

| LU NO. (131) | CAPACITY [GB] (132) | ALLOCATED PARTITION NO. (133) | STORED DATA CATEGORY (134) | ALLOCATED POOL NO. /CHUNK NO. (181) |
|---|---|---|---|---|
| 0 | 60 | 0 | USER DATA | 0/0, 0/1 |
| 1 | 60 | 0 | USER DATA | - |
| 2 | 60 | 0 | USER DATA | 1/0, 1/1 |
| 10 | 100 | 1 | CONTROL INFORMATION | 0/20 |
| 21 | 500 | 2 | CONTROL INFORMATION | - |
| ⋮ | ⋮ | ⋮ | ⋮ | ⋮ |

Fig. 19

CHUNK MANAGEMENT TABLE (150)

| POOL VOL. NO. /CHUNK NO. (181) | ALLOCATED PARTITION NO. (133) | ALLOCATED LU NO. (124) | FREE SPACE [MB] (151) | STORED DATA CATEGORY (134) |
|---|---|---|---|---|
| 0/0 | 1 | 0 | 120 | USER DATA |
| 0/10 | - | - | 1024 | - |
| 0/20 | 2 | 10 | 10 | CONTROL INFORMATION |
| ⋮ | ⋮ | ⋮ | ⋮ | ⋮ |

Fig. 22

| LU MANAGEMENT TABLE 160 | | | | | | |
|---|---|---|---|---|---|---|
| LU NO. 131 | MEDIUM TYPE 161 | CAPACITY [MB] 132 | ALLOCATED PARTITION NO. 133 | STORED DATA CATEGORY 134 | ALLOCATED POOL NO. /CHUNK NO. 181 | ASSOCIATED USER DATA LU NO. 162 |
| 0 | HDD | 1000 | 1 | USER DATA | 0/0, 0/1 | — |
| 1 | SSD | 5000 | 2 | USER DATA | — | — |
| 10 | HDD | 100 | 1 | CONTROL INFORMATION | 1/0, 1/1 | 0 |
| 21 | SSD | 500 | 2 | CONTROL INFORMATION | 0/20 | 0, 1 |
| ⋮ | ⋮ | ⋮ | ⋮ | ⋮ | ⋮ | ⋮ |

Fig. 26

HEAD POINTER MANAGEMENT TABLE (140)

POINTER LIST (141)

| | |
|---|---|
| PARTITION NO. | 0 |
| CONTROL INFORMATION FLAG | 0 |
| FREE QUEUE HEAD POINTER | 0xaaaa |
| CLEAN QUEUE HEAD POINTER | 0x0000 |
| DIRTY QUEUE HEAD POINTER | 0xcc00 |

POINTER LIST (141)

| | |
|---|---|
| PARTITION NO. | 0 |
| CONTROL INFORMATION FLAG | 1 |
| FREE QUEUE HEAD POINTER | 0xaabb |
| CLEAN QUEUE HEAD POINTER | 0x001a |
| DIRTY QUEUE HEAD POINTER | 0x0ffb |

# STORAGE SYSTEM AND MANAGEMENT METHOD OF CONTROL INFORMATION THEREIN

CROSS-REFERENCE TO RELATED PATENT APPLICATIONS

This application is a Continuation of U.S. application Ser. No. 14/013,814, filed Aug. 29, 2013, which is a Continuation of U.S. application Ser. No. 13/054,467, filed Jan. 14, 2011 which is the National Stage of PCT/JP2010/007539 filed Dec. 27, 2010, incorporated herein by reference in its entirety.

TECHNICAL FIELD

This invention relates to a storage system and a management method of control information therein and, in particular, relates to management of control information using a cache memory in a storage system.

BACKGROUND ART

A storage system is equipped with some functions for improving convenience, like snapshot. To perform the snapshot function, control information such as difference information and generation management information is required. In recent years, enhancement for the snapshot function has been desired, such as increase in the number of obtainable generations, increase in the capacity for application, and reduction in size of difference to be obtained. For such functional enhancement, a huge amount of control information is required.

On the other hand, there are cases where a sufficient access performance is required for control information. For example, in an access to control information tied to a user's I/O (Input/Output) request like difference data in the snapshot function, if the access performance to the control information is low, the user's I/O request cannot be processed within a practicable time period.

For this reason, control information requiring a high-speed access is stored in a high-speed memory such as a cache memory or a local memory in some systems. However, since the capacity of a memory to be mounted in a storage system has an upper limit, the amount of control information to be stored in the memory has a limitation. Accordingly, functional specifications for the snapshot, such as the number of generations, the applicable capacity, and the obtainable size of difference data, are limited.

CITATION LIST

Patent Literature

[PTL 1]
JP 2004-30090 A

SUMMARY OF INVENTION

Technical Problem

An approach to solve the limit of memory capacity problem is a layered storage management of control information. The layered storage management stores control information incapable of being stored in a memory into a non-volatile storage device such as an HDD (Hard Disk Drive) and swaps control information between the memory and the HDD. This configuration can facilitate retention of a large amount of control information and high-speed access to the control information together regardless of the limitation of the memory capacity. To achieve high access performance to the control information, it is necessary for the layered storage management of control information to properly manage the amount of control information to be stored in the memory.

Patent Literature 1 discloses a technique that divides a cache memory into a plurality of partitions and holds data of the designated data type in each partition to prevent only a specific data type from having a high cache hit rate. However, the data types indicated in the Patent Literature 1 are the usage pattern of user data and access performance; they do not mean the category of data such as user data or control information.

As a result, according to the technique disclosed in the Patent Literature 1, user data are allocated to the same partition as control information. For this reason, if the storage system creates a large number of snapshots, for example, control information in a partition increases to discard user data from the partition. Consequently, the cache hit rate of user data drastically falls to degrade the performance.

On the contrary, if a partition is filled out with user data because of sequential accesses or other accesses, an access to control information involving I/O with an HDD may degrade the performance in obtaining a snapshot.

In view of the above-described circumstances, an object of this invention is, in a storage system, to make a large amount of control information available, while keeping the access performance to control information as high as possible.

Solution to Problem

A storage system of an aspect of the invention comprises a non-volatile storage area, a cache area and a controller. The cache area includes a control information cache partition in which stored data consist of data different from user data and including control information stored in the non-volatile storage area and a user data cache partition in which stored data include user data stored in the non-volatile storage area. The controller swaps data between the non-volatile storage area and the control information cache partition in accordance with a predetermined algorithm.

Advantageous Effects of Invention

According to an aspect of this invention, a storage system can use a large amount of control information while keeping access performance to control information.

BRIEF DESCRIPTION OF DRAWINGS

FIG. 7 is a diagram exemplifying an LU management table in the first embodiment.

FIG. 18 is a diagram exemplifying an LU management table in the second embodiment.

FIG. 19 is a diagram exemplifying a chunk management table in the second embodiment.

FIG. 22 is a diagram exemplifying an LU management table in the third embodiment.

FIG. 26 is a diagram exemplifying a head pointer management table in the fourth embodiment.

DESCRIPTION OF EMBODIMENTS

Hereinafter, embodiments of this invention will be described. For clarity of explanation, the following descriptions and accompanying drawings contain omissions and simplifications as appropriate. Throughout the drawings, like components are denoted by like reference signs and their repetitive explanation is omitted for clarity of explanation if not necessary.

First Embodiment

Figure 1:
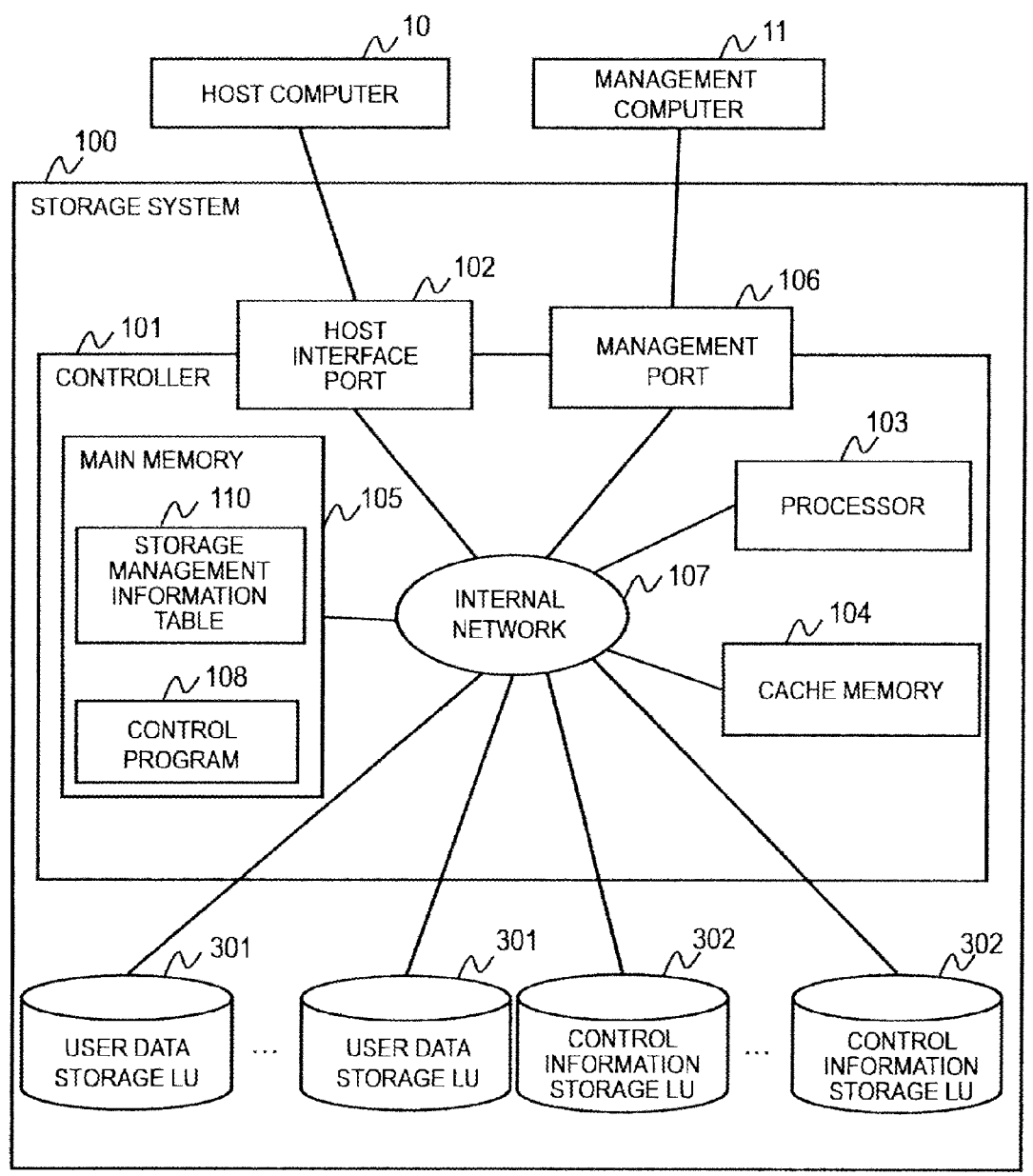
FIG. 1 is a diagram exemplifying a configuration of a storage system in a first embodiment.

Hereinafter, a first embodiment will be explained with reference to FIG. 1 to FIG. 14. FIG. 1 is a block diagram exemplifying a storage system in this embodiment. A storage system 100 comprises a controller 101 for controlling the storage system 100, a host interface port 102 for transmitting and receiving data to and from a host computer 10.

The storage system 100 further comprises a processor 103, a cache memory 104, a main memory 105, a management port 106 for connecting the storage system 100 to a management computer 11 for managing the storage system 100. The cache memory 104 may be physically the identical memory as the main memory 105. The numbers of individual components may be two or more.

The storage system 100 further comprises a user data storage LU (Logical Unit) 301 for storing user data and a control information storage LU 302 for storing control information. The control information is used for operational control of the storage system 100 and includes commands and control data other than commands (for example, difference data for the snapshot function). In this description, data may include user data and control information.

Typically, the storage system 100 comprises a plurality of user data storage LUs 301 and control information storage LUs 302 as shown in FIG. 1. The storage system 100 comprises an internal network 107 interconnecting the components. Hereinafter, for convenience of explanation, a storage system 100 comprising one each of user data storage LU 301 and control information storage LU 302 will be described.

The main memory 105 holds a control program 108 and a storage management information table 110, which will be described later. The control program 108 is software for interpreting an I/O (Input/Output) request command issued by the host computer 10 to control internal operations of the storage system 100 such as a data write and a data read. The control program 108 has functions to improve capability of the storage system 100, such as Snapshot and dynamic provisioning.

An LU is a unit of logical storage area, which is a unit for an input or output access in the storage system 100, and is a non-volatile storage area. The host computer 10 regards an LU allocated to itself as a storage device (volume). An LU is typically a storage area provided by a RAID (Redundant Array of Independent Disks) system. A volume may consist of the storage areas of a plurality of LUs.

A RAID system is typically composed of HDDs (Hard Disk Drives) or SSDs (Solid State Drives), but may be composed of a plurality of non-volatile data storage devices other than these. An LU is preferably a storage area in such a system having redundancy, but this shall not apply to this embodiment and it is sufficient as long as the LU is a storage area for storing data or control information.

Figure 2:
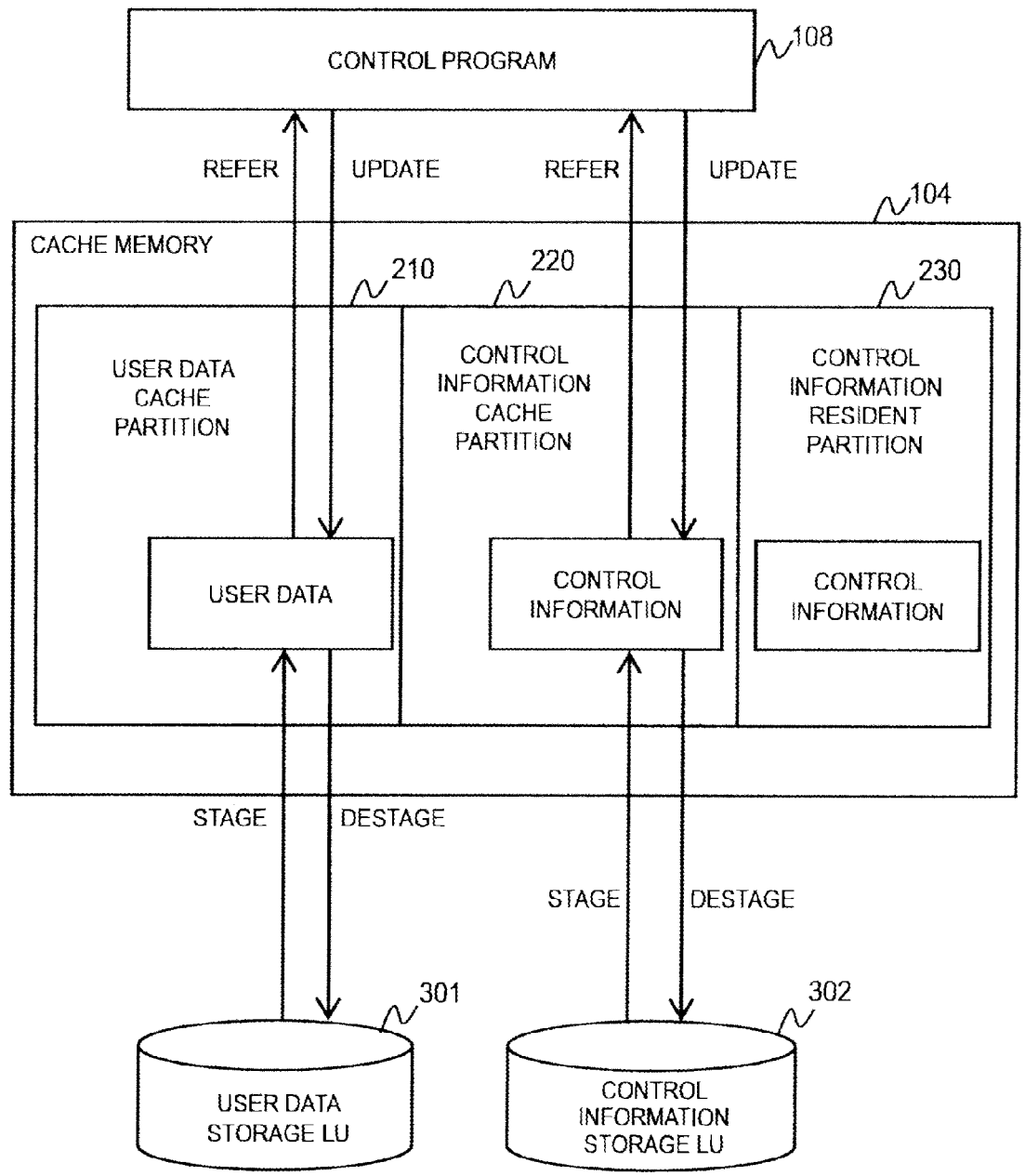
FIG. 2 is a diagram illustrating an outline of cache management in the first embodiment.

FIG. 2 is a block diagram illustrating an outline of cache management of the first embodiment. A cache memory 104 is a memory area having a cache function; one or more physical memory devices provide a memory area for the cache memory 104. Typically, the cache memory 104 is a volatile semiconductor storage area, but in this embodiment, any type of memory device may be used for the cache memory 104.

As shown in FIG. 2, the cache memory 104 in this embodiment comprises a plurality of partitions. The plurality of partitions includes at least a user data cache partition 210 and a control information cache partition 220. The cache memory 104 may include a plurality of user data cache partitions and a plurality of control information cache partitions. In this document, an area defined logically or physically in a cache memory is called a partition. A partition storing user data is called a user data partition and a partition storing control information is called a control information partition.

The user data cache partition 210 is a memory area for user data caching and passes user data to and from the control program 108. The user data is data transmitted and received between the storage system 100 and the host computer 10.

For example, the control program 108 that has received an I/O request command issued by the host computer 10 performs staging of specific user data from the user data storage LU 301 to the user data cache partition 210. Staging is a process that writes data in an LU to a cache memory 104.

In accordance with a reference request of the control program 108, the controller 101 stages user data from the user data storage LU 301 to the user data cache partition 210. The control program 108 refers to the user data in the user data cache partition 210.

The control program 108 also updates the user data in the user data cache partition 210. The updated user data is reflected to the user data storage LU 301 synchronously or asynchronously with the updating (destaging). Destaging is a process that writes the updated data in a cache memory 104 to an LU to make the data in the cache memory to agree with the data in the LU.

The user data in a partition is managed in a queue in accordance with a predetermined algorithm. Typical algorithms are LRU (Least Recently Used) or FIFO (First In First Out). A user data cache partition 210 may be associated with one or more LUs. The user data cache partition 210 may store user data only or may store control information as well as the user data.

The control information cache partition 220 stores data which is different from user data and includes control information. Stored data in the control information cache partition 220 consists of data different from user data and including control information, with the result that larger amount of control information can be cached. In a preferred configuration described hereafter, data stored in the control information cache partition 220 consists of control information. The control information cache partition 220 is a memory area for data caching of control information and passes control information to and from the control program 108. The control information is stored in the control information storage LU 302 and stored (staged) from the control information storage LU 302 to the control information cache partition 220 in accordance with an instruction of the control program 108.

The control program 108 refers to control information stored in the control information cache partition 220 and updates it. The updated control information is destaged to the control information storage LU 302 synchronously or asynchronously with the updating. The control information in the control information cache partition 220 is also managed in a queue in accordance with a predetermined algorithm. This algorithm may be the same as the one in the user data cache partition 210 or different from it. Preferably, the queue is different from the one for the user data cache partition 210.

The control information cache partition 220 is associated with one or more control information storage LUs 302 and the data stored therein is composed of control information (data). Such a partition that does not store user data but stores control information only allows (an area for storing) an appropriate amount of control information to be secured all the time for controlling the storage system 100.

This embodiment, in its preferable configuration, includes a control information resident partition 230 in the cache memory 104 for control information to be resident. The control information resident partition 230 is a partition where resident is control information undesirable to be staged from the control information storage LU 302 by the control program 108, for example, because of its severe performance requirement.

The control program 108 refers to the control information resident partition 230. The control program 108 may update and destage data in the control information resident partition 230 but it will not swap the data with other data (data at other address) in the LU. The control information resident partition 230 allows specific control information to be held in the cache all the time without interference from other control information.

FIG. 2 exemplifies a user data cache partition 210 and two control information cache partitions (one of them is the control information resident partition 230), but the control program 108 may define a plurality of user data cache partitions 210, a plurality of control information resident cache partitions 230, and a plurality of control information cache partitions 220 in the cache memory 104.

Figure 3:
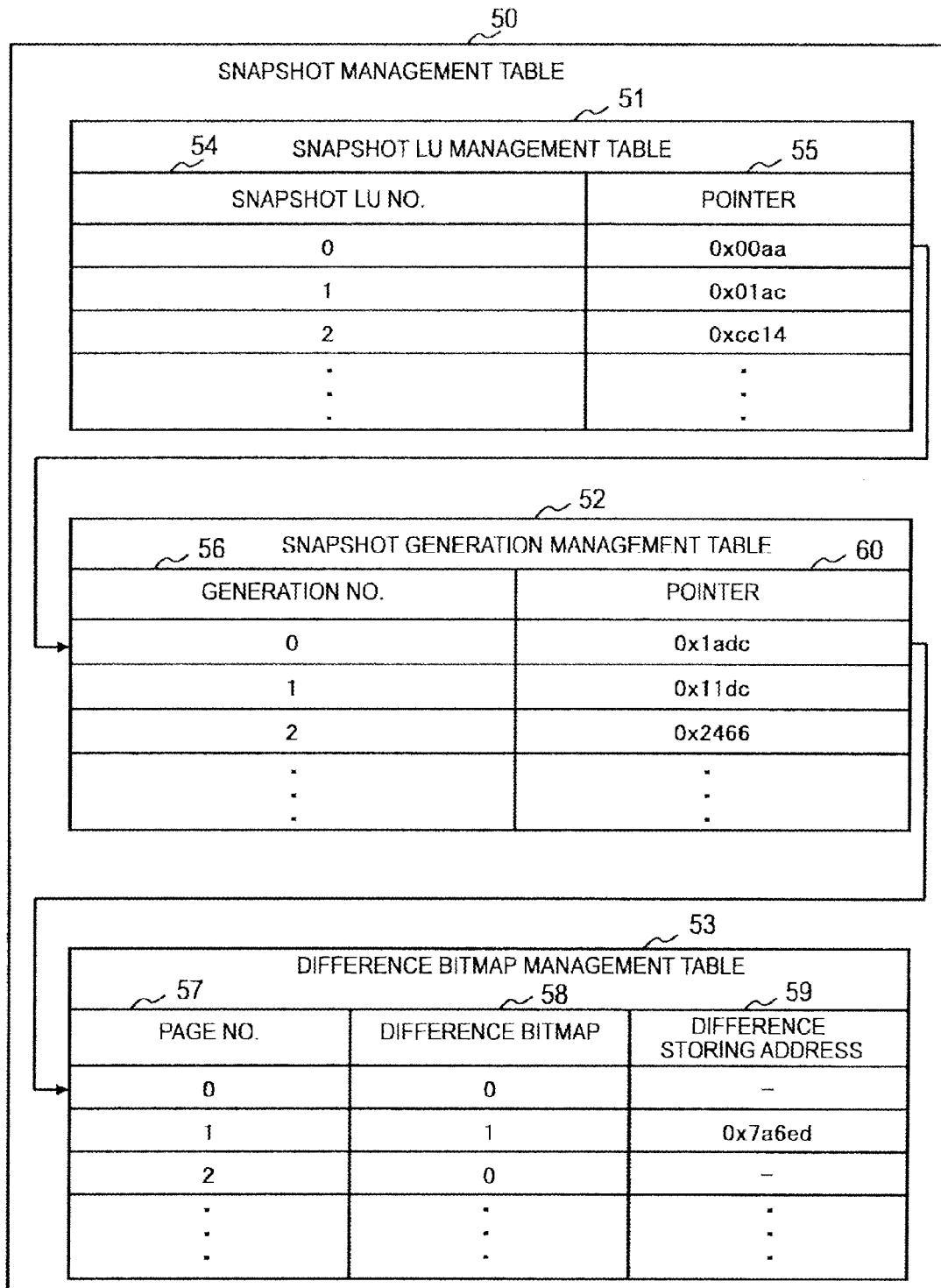
FIG. 3 is a diagram exemplifying control information in the first embodiment.

FIG. 3 is a block diagram exemplifying control information for the snapshot function in the storage system 100. The snapshot function is a function that creates an image of at some point of an LU. Specifically, every time an update occurs to an LU, the control program 108 sequentially records the positional information (address) of the update and the data prior to the update to manage the LU's update history. Through this function, the control program 108 can restore an LU to any previous state.

To perform such a snapshot function, control information for snapshots is necessary. FIG. 3 illustrates a snapshot management table 50 as an example of such control information. The snapshot management table 50 is a table including a snapshot LU management table 51, a snapshot generation management table 52, and a difference bitmap management table 53.

Although FIG. 3 shows one each of snapshot generation management table 52 and difference bitmap management table 53, the snapshot management table 50 includes snapshot generation management tables 52 for all of the snapshot LU numbers and difference bitmap management tables 53 for all of the generation numbers in all of the snapshot generation management tables 52.

The snapshot LU management table 51 includes columns of snapshot LU number 54 and pointer 55. A field of the snapshot LU number 54 stores a number for identifying an LU for which a snapshot is obtained. The value in this field may be any kind of value as far as the LU can be identified. A field of the pointer 55 stores a pointer indicating the snapshot generation management table 52 for the relevant LU.

The snapshot generation management table 52 includes columns of generation number 56 and pointer 60. A field of the generation number 56 stores a value indicating the generation of an obtained snapshot for the relevant LU. Every time a snapshot is obtained, a new field is added to the generation number 56 (and the pointer 60 as well). The generation number 56 may be any kind of identifier for identifying a generation. A value (pointer) in a field of the pointer 60 in the snapshot generation management table 52 indicates the difference bitmap management table 53 for the relevant generation.

The difference bitmap management table 53 includes columns of page number 57, difference bitmap 58, and difference storing address 59. The page represents a unit of amount in an update obtained by the snapshot function and one page typically amounts to several kilobytes to several megabytes. A field of the page number 57 stores a number for identifying a page in a generation number 56 of the relevant LU. A field of the page number 57 may store an identifier other than a number.

A field of the difference bitmap 58 stores a bit for distinguishing whether the relevant page has been updated or not. For example, a field of the difference bitmap 58 for an updated page stores "1" and a field for a not-updated page stores "0". A field of the difference storing address 59 stores an address indicating an area storing the difference of the relevant page, or contents prior to obtaining a snapshot of the LU.

The control program 108 updates the difference bitmap management table 53 every time it updates an LU and updates the snapshot generation management table 52 every time it obtains a new snapshot in the snapshot management table 50.

In this way, the control information is different in frequency of reference or update and in trigger event for reference or update depending on the table. Accordingly, the partitions may be used such that, for example, the control information resident partition 230 holds the control information in the difference bitmap management table 53 resident therein and the control information cache partition 220 stores the control information in the snapshot generation management table 52 and the snapshot LU management table 51.

In addition, although not shown in the drawings, the control program 108 may choose a partition to be used depending on the kind of control information. For example, if control information for managing the RAID configuration of an LU is stored in only the LU, the RAID configuration might not be restored at an LU failure. The control program 108 stores the control information in the control information resident partition 230 to enable restoration of the RAID configuration.

Figure 4:
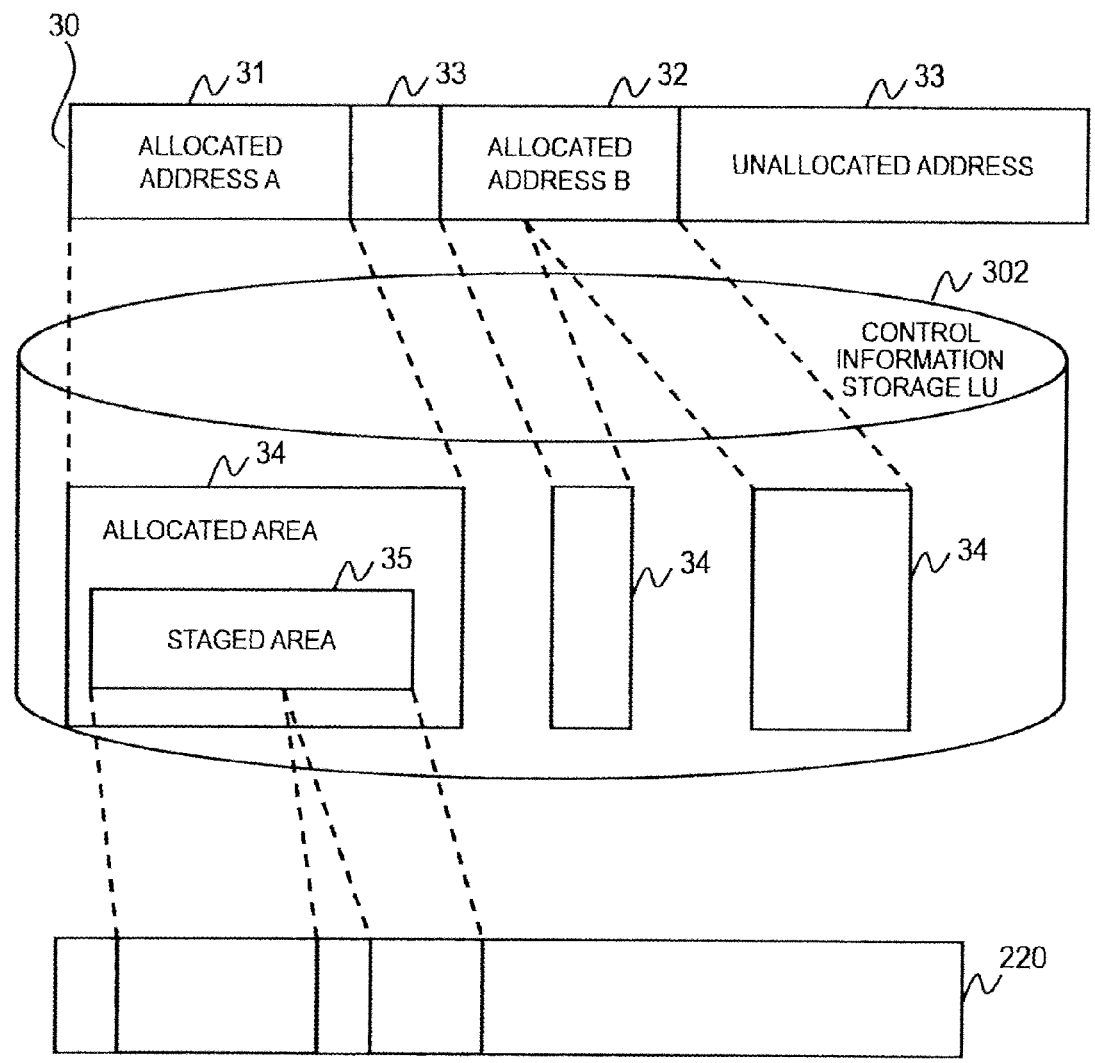
FIG. 4 is a diagram illustrating a concept of an address space in the first embodiment.

FIG. 4 is a block diagram exemplifying a concept of an address space for layered management in this invention. This embodiment preliminarily prepares a vast virtual address space 30 in the control program 108. The control program 108 may use the virtual address space 30 freely. For example, it may allocate a part of the virtual address space 30 to the control information for the snapshot function.

In this description, an address which has been allocated to the control information is referred to as an allocated address and an address which has not been allocated to the control information is referred to as an unallocated address. In the control information storage LU 302, the area associated with the allocated address is referred to as an allocated area. A part or the whole of the virtual address space 30 is associated with the storage area of the control information storage LU 302.

A continuous part of the virtual address space 30 may be associated with a storage area consisting of discontinuous sections (a discontinuous area) in the control information storage LU 302. For example, an allocated address A 31 is associated with a continuous allocated area 34 in the control information storage LU 302 but an allocated address B 32 is associated with a discontinuous allocated area 34 in the control information storage LU 302.

A part or the whole of an allocated area 34 is stored (staged) in the storage area of the control information cache partition 220. The area which has been staged (copied from the LU) out of the allocated area 34 is referred to as a staged area. The staged area 35 is stored in the control information cache partition 220; it may be stored in either one of a continuous area and a discontinuous area in the control information cache partition 220.

In this example, all of the control information is stored in the storage area of the control information storage LU 302. In accordance with an instruction of the control program 108, the controller 101 copies (stages) a part of the control information to the control information cache partition 220. The control program 108 may store all of the control information in a control information storage LU to the control information cache partition 220.

The control program 108 refers to or updates the control information stored in the control information cache partition 220. The control program 108 may dynamically determine the storage areas to be allocated to the control information cache partition 220; otherwise, the entire virtual address space 30 may be associated with the control information storage LU 302. The control program 108 stages control information selected from the control information storage LU 302 in association with the virtual address space 30 into the control information cache partition 220.

Figures 5, 6:
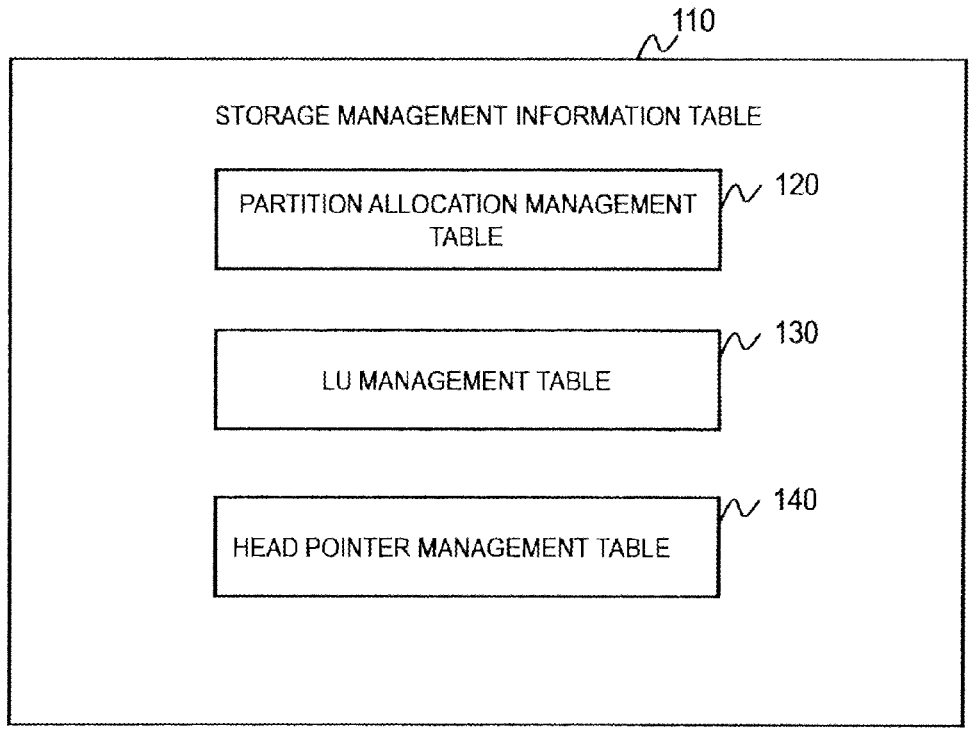
FIG. 5 is a diagram exemplifying a storage management information table in the first embodiment.
FIG. 6 is a diagram exemplifying a partition allocation management table in the first embodiment.

FIG. 5 is a block diagram exemplifying a configuration of a storage management information table 110. The storage management information table 110 includes a partition allocation management table 120, an LU management table 130, and a head pointer management table 140. Details of these tables will be explained with reference to FIG. 6 to FIG. 8. In this embodiment, information stored in the main memory 105 does not depend on data structure and may be expressed in any data structure. For example, the storage management information table 110 may include a different number of tables or a table in a different structure from the above-described three tables.

FIG. 6 is a block diagram exemplifying the partition allocation management table 120. The partition allocation management table 120 includes the columns of partition number 121, segment size 122, capacity 123, allocated LU number 124, resident flag 125, and control information allocation flag 126.

The partition number column 121 stores numbers for uniquely identifying individual partitions out of a plurality of partitions obtained by dividing the cache memory 104. It usually stores sequential numbers; otherwise, it may store any kind of values for identifying the partitions. The segment size column 122 stores values for indicating the management sizes of the partitions. Different partitions may have the same value or different values.

Providing different segment sizes appropriate for the sizes and the usages of data using the cache memory improves the performance of the storage system 100. For example, comparatively small size of data I/Os of about several kilobytes are generated for database use, so the segment size is set at several kilobytes to enable a number of I/Os to be cached.

On the other hand, for large size of data I/O like in streaming, the segment size is set large, for example, at 256 kilobytes, to enable the large size of data to be cached without being divided. Such preparation of appropriate segment sizes will lead to improvement of the performance of the storage system 100.

The capacity column 123 stores values indicating the cache capacity of individual partitions. The allocated LU number column 124 stores numbers for uniquely identifying LUs allocated to the partitions. It may store any other kind of values that can uniquely identify the LUs. In this embodiment, a plurality of LUs may be allocated to a partition. Although not shown in the drawing, data in an LU may be stored into a plurality of cache partitions.

A field of resident flag 125 stores a flag indicating whether a specific LU is resident or not in the relevant cache partition. For example, a field of the resident flag 125 stores "1" if an LU is resident in the partition, and it stores "0" if not. A resident flag field for a partition without an LU allocated stores a value indicating "−", for example, to be discriminated from the partitions storing data.

FIG. 6 indicates that, for example, in the partition whose partition number 121 is 2, data in the LU having the LU number 21 is resident. When the data in a specific LU is resident in the cache memory, the control information and user data stored in the resident LU are definitely hit in the cache, so that the I/O performance will improve. In this embodiment, a plurality of LUs can be resident in a partition of the cache memory. It should be noted that a cache partition may store only a part of the data of the allocated LUs.

A field of control information allocation flag 126 stores a flag indicating whether a control information storage LU 302 has been allocated to the relevant partition or not. For example, a field of the control information allocation flag 126 stores "1" if a control information storage LU 302 has been allocated, and it stores "0" if a user data storage LU 301 has been allocated.

A field for a partition with no LU allocated stores a value indicating "–", for example, to be discriminated from other partitions with LUs allocated. The control information allocation flag 126 is a flag to identify whether the partition is a control information cache partition 220 or a control information resident partition 230. The control program 108 refers to this flag when performing different processes among the partitions.

For example, in a preferred configuration, the control program 108 determines management methods of partitions independently for the user data cache partition 210 and the control information cache partition 220. Specifically, the control program 108 independently determines algorithms of queues (such as LRU and FIFO) for the two partitions 210 and 220.

It is preferable that the control program 108 change the cache management method for a partition depending on the access condition to user data. For example, the control program 108 adjusts the parameter for the LRU depending on the access condition. This adjustment keeps a high cache hit rate in the user data cache partition 210 even though the access condition changes.

In the meanwhile, user data and control information are different in access characteristics; the access condition to the control information does not change like that to the user data. Accordingly, determining the management methods for the partitions independently leads to application of appropriate management methods to the respective partitions, achieving high cache hit rates in both of the partitions.

The control program 108 saves the data in the cache memory 104 to a non-volatile storage area at a power shutdown caused by a power failure or other failures. In the saving operation, the control program 108 places a higher priority on the control information cache partition 220 than the user data cache partition 210. Saving the control information prior to the user data achieves securer protection of important control information. It is preferable that the control program 108 put the highest priority on the control information resident partition 230. The data is saved to, for example, a predetermined non-volatile storage area in the system 100 or the LU corresponding thereto.

FIG. 7 is a block diagram exemplifying the LU management table 130. The LU management table 130 is a table for managing LUs in the storage system 100 and comprises columns of LU number 131, capacity 132, allocated partition number 133, and stored data category 134.

The LU number column 131 stores numbers for identifying individual LUs and may store any kind of values for identifying the LUs. The capacity column 132 stores values indicating the whole capacities of individual LUs. The allocated partition number column 133 stores values indicating the numbers of cache partitions allocated to the LUs and the values correspond to the values of the partition number column 121 in the partition allocation management table 120.

The stored data category column 134 stores values indicating the categories of data stored in the LUs; each field stores a value indicating "user data" if the relevant LU holds user data and stores a value indicating "control information" if it holds control information. The values may be "0" and "1", for example.

Figure 8:
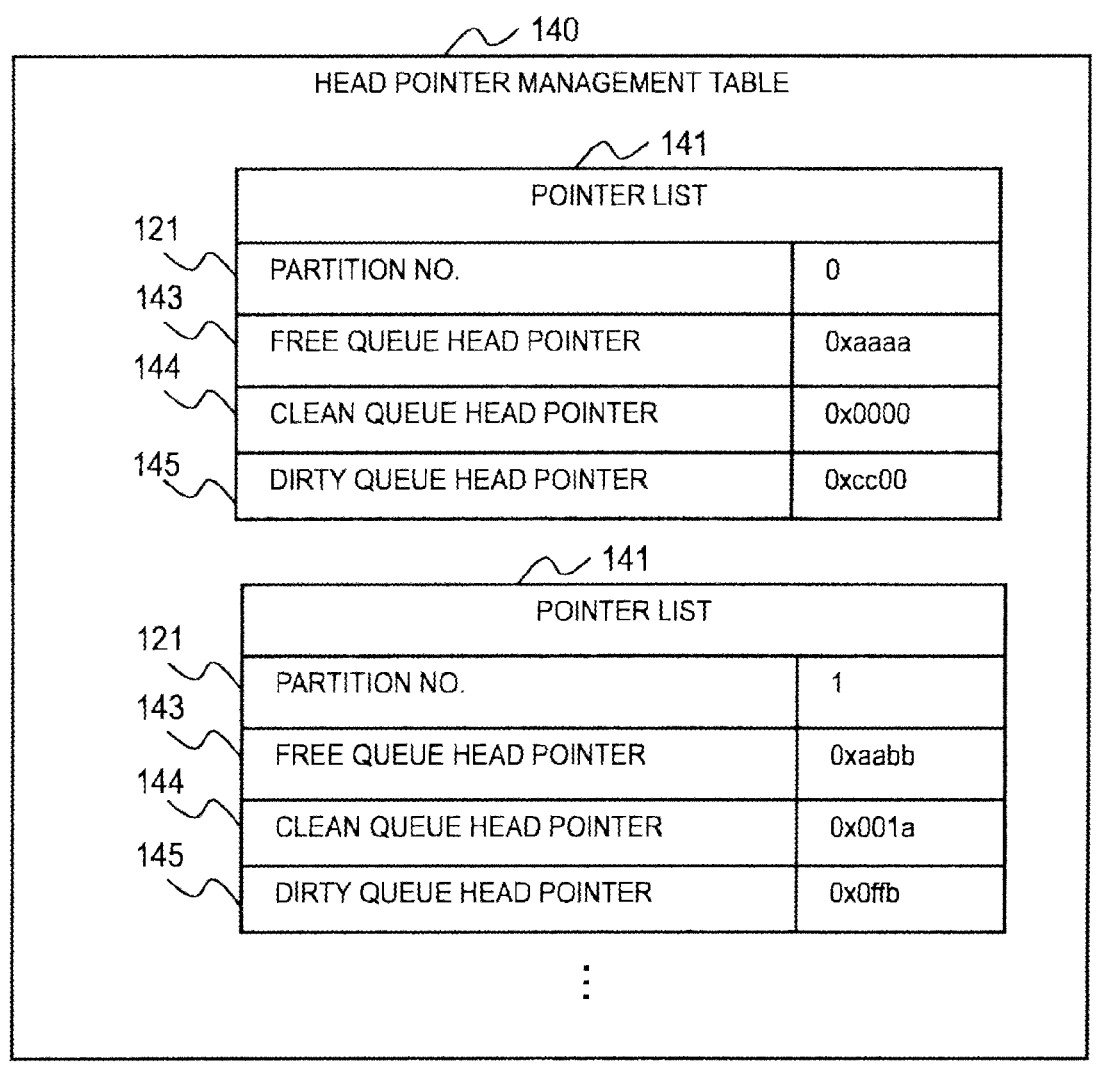
FIG. 8 is a diagram exemplifying a head pointer management table in the first embodiment.

FIG. 8 is a block diagram exemplifying the head pointer management table 140. The head pointer management table 140 includes a plurality of pointer lists 141. Each of the pointer lists 141 is associated with each partition created in the cache memory 104. A pointer list 141 stores values of partition number 121 of the associated partition, free queue head pointer 143, clean queue head pointer 144, and dirty queue head pointer 145.

In the first embodiment, the storage area of a cache partition is composed of a plurality of segments. The control program 108 manages the cache partition in each individual segment and manages segments in different statuses with different queues. The status of a segment is "free" if the segment does not hold anything, "clean" if the segment holds data and an LU holds the same data, or "dirty" if an LU does not hold the same data as the segment, for example.

A segment in which data has just been stored from an LU is "clean" and turns into "dirty" if the data is updated. The "dirty" segment turns into "clean" or "free" by destaging of the data to an LU.

The control program 108 (the controller 101) manages each queue with a algorithm such as LRU (Least Recently Used) and FIFO. The control program 108 refers to the head pointer of each queue in the pointer list 141 to access the queue. Such management with queues by the control program 108 allows dynamic data swapping between a cache partition and a non-volatile storage area.

Management with independent queues in individual partitions like in FIG. 8 prevents the partitions from affecting one another in performance. Although the pointer list 141 in this embodiment has three kinds of queues, the kinds of queues are not limited to these in this invention.

The control program 108 stores (copies) new data from a non-volatile storage area to free segments. The control program 108 refers to clean segments and dirty segments and updates their storage data, but does not store (stage) new data (data at other addresses in the non-volatile storage area) there.

For example, when the number of free segments has reached a predetermined value (including zero) or less, the control program 108 updates the clean queue to change a part or all of the clean segments into free segments. For example, it resets the clean segments into free segments by the difference between the current number of free segments and the predetermined number. If the current number of clean segments does not reach the number of the difference, the control program 108 resets all of the clean segments into free segments. The way of selecting the clean segments to be free follows the algorithm for the clean queue.

The control program 108 destages dirty segments when the number of dirty segments has reached a predetermined number or more, or the number of clean segments has reached a predetermined number or less. The control program 108 resets the dirty segments into clean segments. The control program 108 may perform destaging at a different trigger event. It may also reset dirty segments into free segments.

The control program 108 resets segments holding data in a cache partition into free segments and copies new data in the non-volatile storage area to the free segments to dynamically swap data between the cache area and the non-volatile storage area. The control program 108 may swap data in a different method.

For example, the control program 108 may copy (stage) new data (data at other addresses) from an LU to a clean segment or a dirty segment. To store new data into a dirty segment, destaging is performed in advance. Otherwise, the control program 108 may manage all of the segments by a single queue to determine the segment for copying the data in the LU in accordance with a predetermined algorithm.

Figure 9:
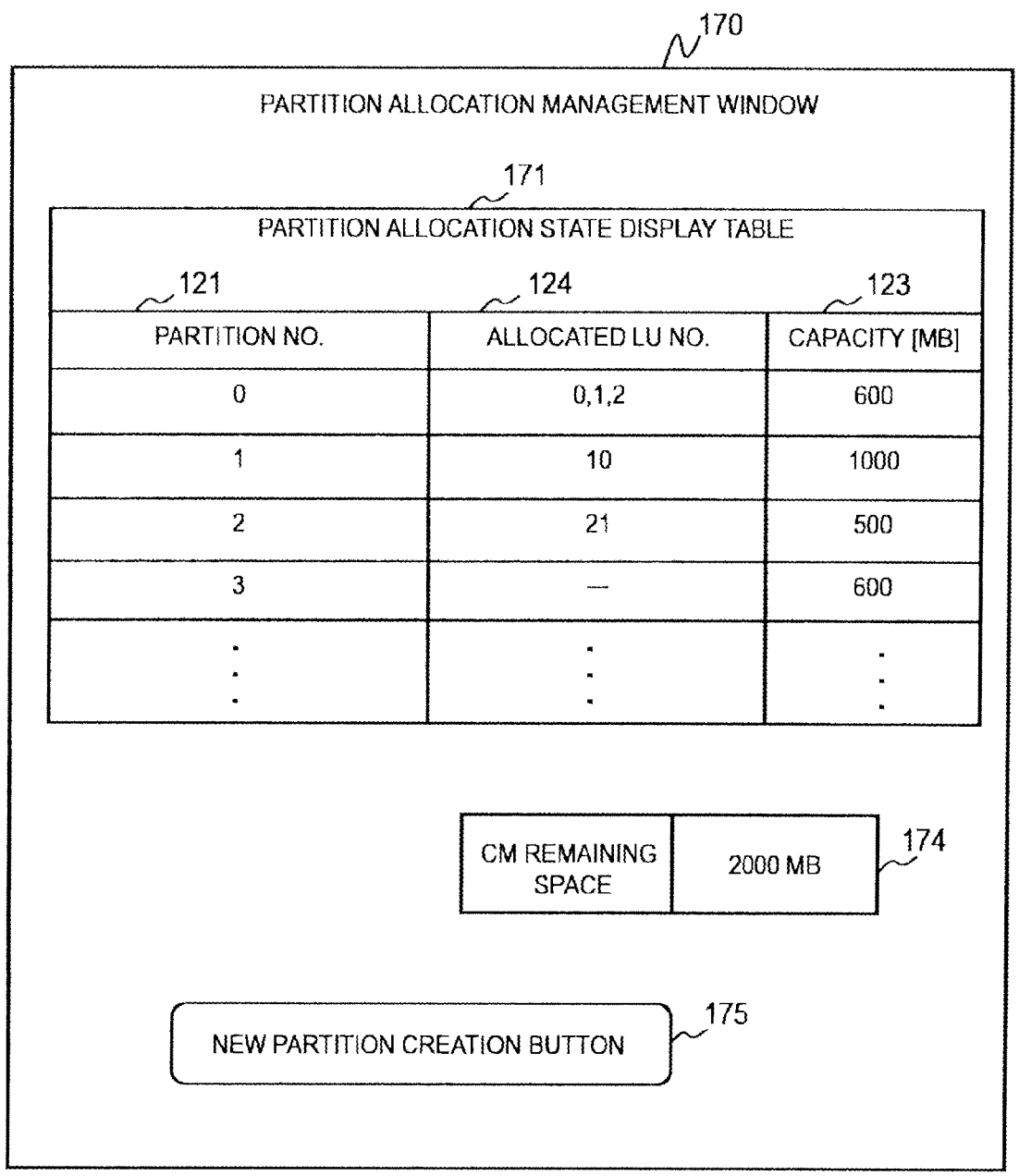
FIG. 9 is a diagram exemplifying a partition's allocation display window in the first embodiment.

FIG. 9 is a block diagram illustrating a partition allocation management window 170. The partition allocation management window 170 is displayed by the monitor of the management computer 11 for managing the storage system 100. The storage administrator manipulates the allocation of the LUs to the partitions using an input device (for example, a keyboard or a mouse) while looking at the window. Besides, the administrator can create a new partition through the input and output device of the management computer 11.

In this example, the partition allocation management window 170 includes a partition allocation state display table 171, a CM remaining space indicator 174, and a new partition creation button 175. The partition allocation state display table 171 includes columns of partition number 121, allocated LU number 124, and capacity 123. The information of those columns is a part of the information of the partition allocation management table 120 of FIG. 6 and is retrieved from the table 120.

The storage administrator reads the partition allocation state display table 171 to check the state of allocation to the partitions. The CM remaining space indicator 174 indicates the value obtained by deducting the amount of area allocated to the partitions from the capacity of the cache memory 104 (the total amount of undefined area), which is the space of the cache memory 104 available for allocation in creating a new partition. The new partition creation button 175 is a button for creating a new partition to move to allocation of LUs to the partition.

Figure 10:
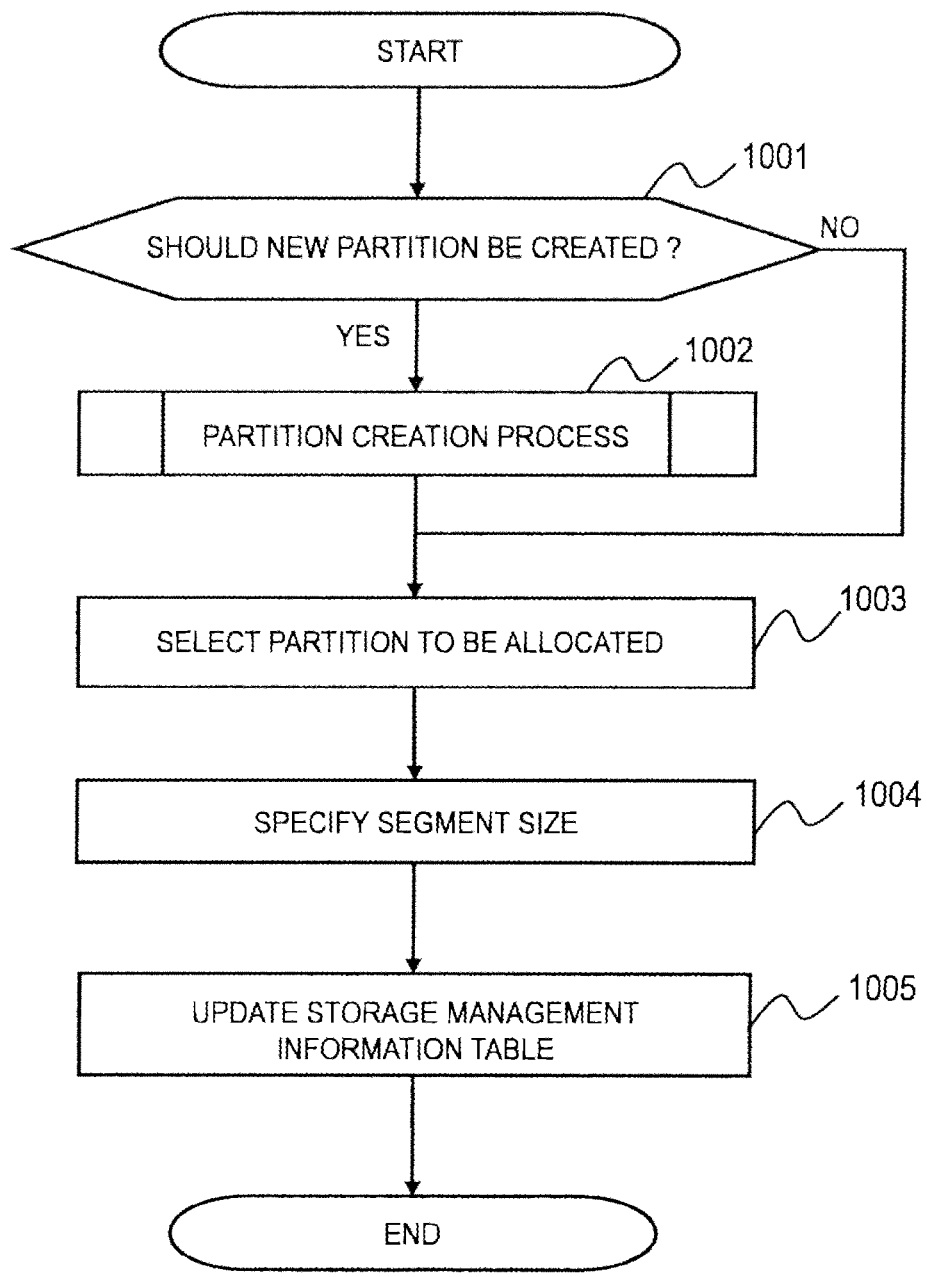
FIG. 10 is a flowchart exemplifying a procedure of allocating an LU to a partition in the first embodiment.

FIG. 10 is a flowchart of a procedure of newly allocating an LU to a partition. This flowchart and the subsequent flowcharts will be explained assuming that the processor 103 (the control program 108) in the controller 101 performs processes in accordance with instructions of the storage administrator or the control program 108, but this assumption is not definite in this invention. The start of this procedure in this flowchart may be triggered by a push of the new partition creation button 175 or by the storage administrator's operation using any other interface.

First, the processor 103 determines whether a new partition needs to be created or not (step 1001). Since this embodiment allocates a partition to LUs, allocation of a partition is impossible unless an unallocated partition exists. Even if an unallocated partition exists, it newly creates a partition in the case that its capacity is short.

At the step 1001, the processor 103 may ask the storage administrator through the partition allocation management window 170. If the determination result at the step 1001 is YES, the processor 103 proceeds to a partition creation step (step 1002). The step 1002 will be described later with reference to FIG. 11.

If the determination result at the step 1001 is NO or after completing the step 1002, the processor 103 selects a partition to be allocated (step 1003). The processor 103 may have the storage administrator designate the number of the partition to be allocated or automatically select a partition. Next, the processor 103 specifies the segment size of the partition to be allocated (step 1004).

At the step 1004, the processor 103 may ask the storage administrator through the partition allocation management window 170 or automatically specify the segment size. At the end, the processor 103 updates the storage management information table 110 on the basis of the update through this procedure (step 1005) to terminate the process.

Figure 11:
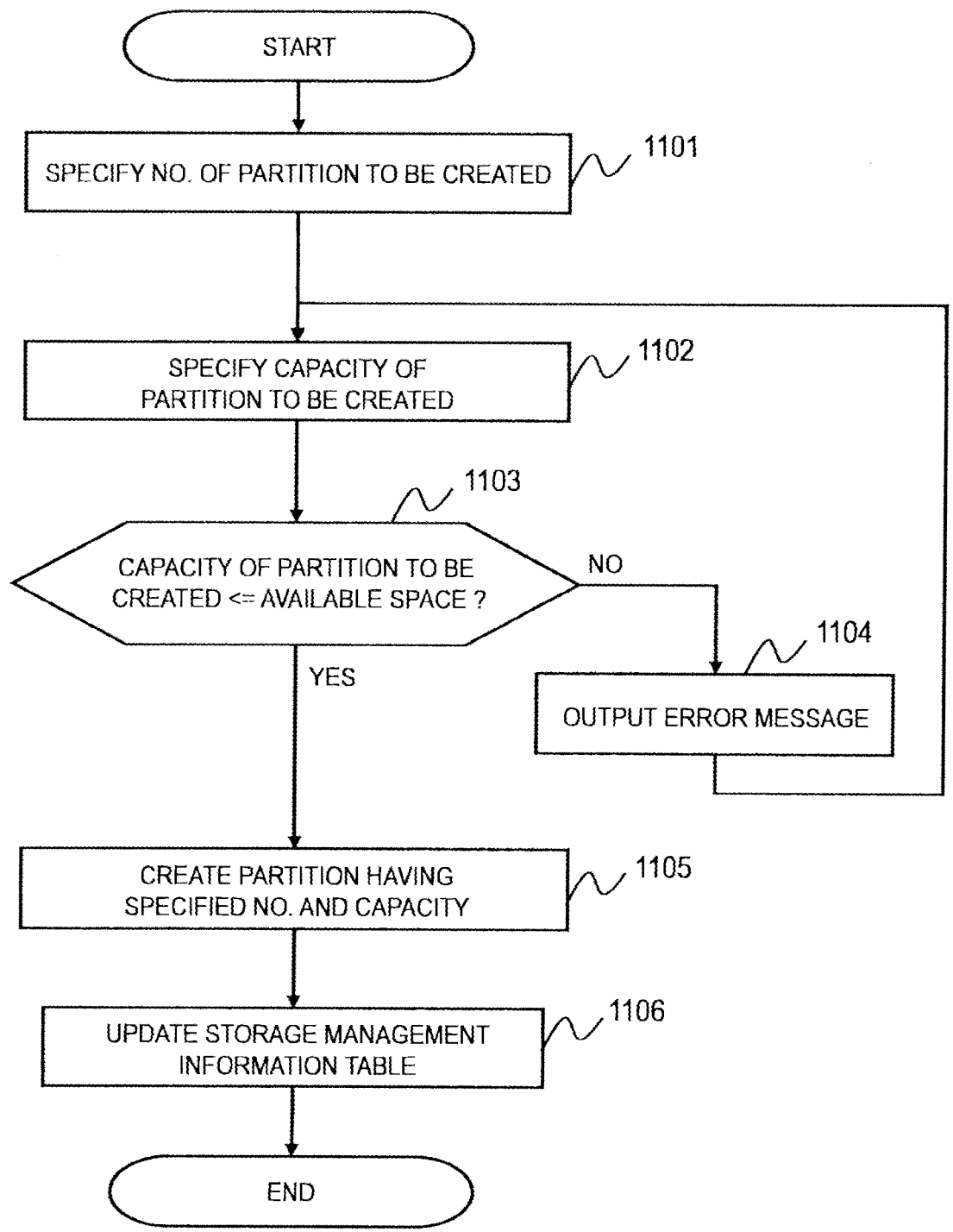
FIG. 11 is a flowchart exemplifying a procedure of newly creating a partition in the first embodiment.

FIG. 11 is a flowchart of a procedure of newly creating a partition by the processor 103 which follows the control program 108 and shows details of the step 1002 in FIG. 10. First, the processor 103 specifies the number of the partition to be newly created (step 1101). The number to be specified is one except for the numbers already having been allocated. Next, the processor 103 determines the capacity of the partition to be created, which has been specified by the management computer 11 (step 1102).

Next, the processor 103 determines whether the capacity specified at the step 1102 is equal to or less than the amount indicated by the CM remaining space indicator 174 (step 1103). If the determination result at the step 1103 is NO, the processor 103 sends an error message to the management computer 11 to urge the management computer 11 to specify a capacity equal to or less than the CM remaining space indicator 174 (step 1104), and returns to the step 1102. The management computer 11 displays the error message on its monitor.

If the determination result at the step 1103 is YES, the processor 103 creates a partition having the number specified at the step 1101 and the capacity specified at the step 1102 (step 1105). At the end, the processor 103 updates the storage management information table 110 on the basis of the update through this procedure (step 1106) to terminate this process.

Figure 12:
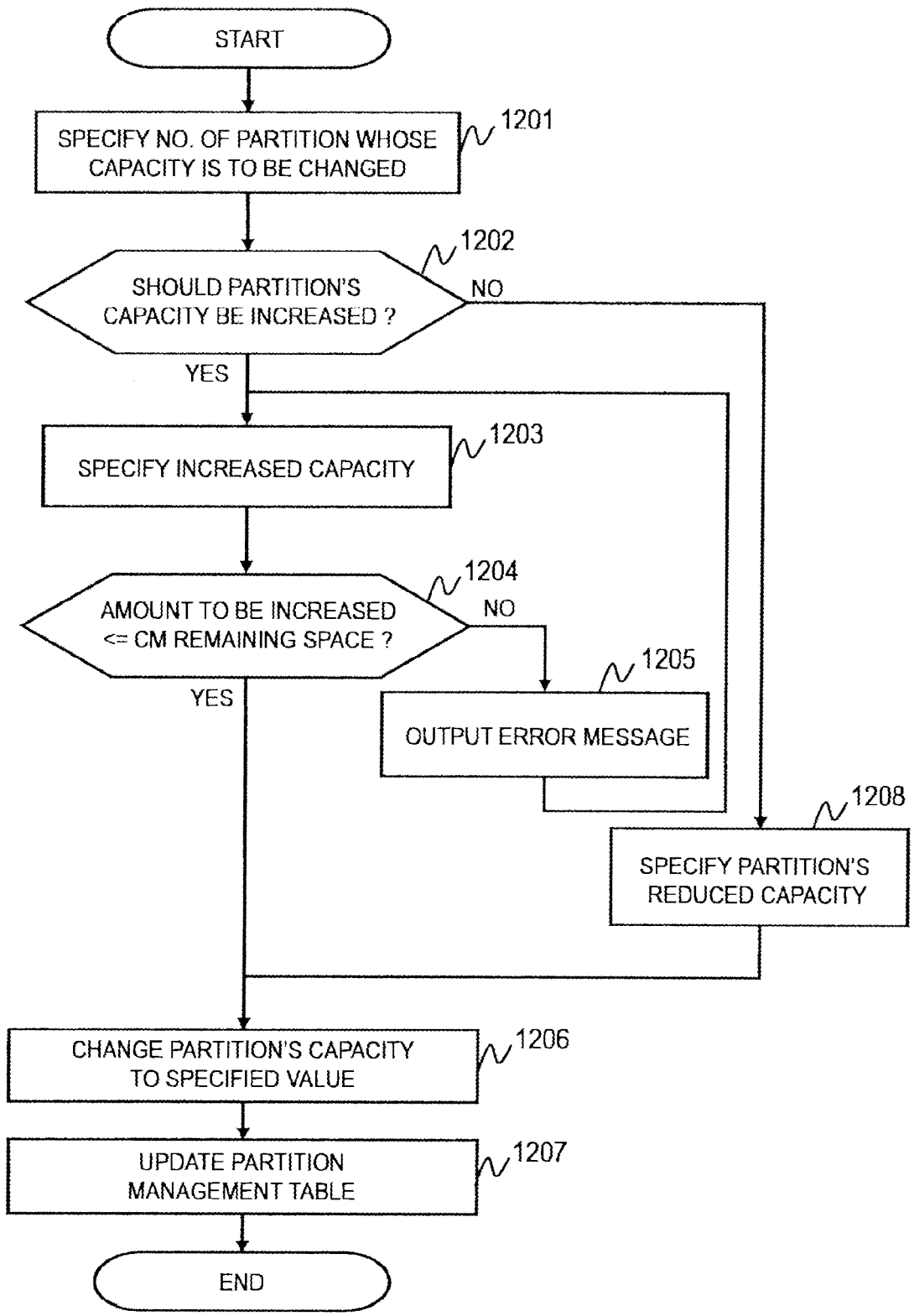
FIG. 12 is a flowchart exemplifying a procedure of changing the capacity of a partition in the first embodiment.

FIG. 12 is a flowchart of a procedure of changing the capacity of a cache partition. With increase of a cache partition's capacity, the amount of user data or control information existing in the cache partition increases. Accordingly, the access rate to an HDD or other non-volatile storage media will be reduced to improve I/O performance.

The processor 103 changes the capacity of a cache partition in accordance with the control program 108 or the storage administrator's request. First, the processor 103 obtains the number of the designated partition from the management computer 11 (step 1201). Next, the processor 103 refers to the instruction from the management computer 11 to determine whether to increase the capacity of the partition or not (step 1202). If the capacity is to be increased (the determination result at the step 1202 is YES), the processor 103 identifies the specified capacity of the partition after the increase (step 1203).

Next, the processor 103 determines the amount to be increased (specified amount to be increased) for the partition from the identified capacity of the partition after the increase and determines whether it is equal to or less than the value indicated by the CM remaining space indicator 174 (step 1204). If the determination result at the step 1204 is NO, the processor 103 sends an error message to urge the management computer 11 to specify a capacity equal to or less than the CM remaining space (step 1205) and returns to the step 1203. The management computer 11 displays the received error message on the screen of its monitor.

If the determination result at the step 1204 is YES, the processor 103 changes the partition's capacity to the specified value (step 1206). To increase the capacity, the processor 103 adds the specified amount taken from the undefined area to the designated partition. The processor 103 updates the capacity 123 in the partition allocation management table 120 and the value of the CM remaining space indicator 174 (step 1207), to terminate the process.

If the determination at the step 1202 is NO (to reduce the capacity), the processor 103 identifies the capacity after the reduction specified by the management computer 11 and determines the amount to be reduced (specified amount to be reduced) from the identified value (step 1208). and proceeds to the step 1206. To reduce the capacity, the processor 103 adds the specified amount taken from the designated partition to the undefined area.

In a preferred configuration, the controller 101 (the processor 103 or any other circuit module) may monitor the performance of every partition, calculate the optimum capacity of each partition so that the performance of the whole system will be optimized, and recommend the optimum capacity to the storage administrator. A preferable value to indicate the performance of partition is cache hit rate. The processor 103 sends the calculated optimum capacity to the management computer 11 and the management computer 11 displays the value on its monitor.

For example, the processor 103 compares the cache hit rate of each partition with a value preset on each partition. The processor 103 sets the optimum capacity of a partition for which the cache hit rate does not reach the preset value at a value larger than the current value. The processor 103 may set the optimum capacity of a partition for which the cache hit rate is greater than the preset value and the difference between them is larger than a predetermined value at a value smaller than the current value.

The preset value on a partition may be different depending on the category of the partition or the partition. Since the control information in the control information resident partition 230 requires a speedy access, it is preferable not to reduce the capacity. The management computer 11 may receive the cache hit rates of the partitions from the controller 101 and display them on the monitor. The storage administrator can select a partition whose capacity should be changed with reference to the values.

If the specified amount to be increased in the designated partition is less than the value of CM remaining space indicator 174, the processor 103 may reduce the capacity of another partition (by an instruction from the management computer 11) to make up the amount to be increased. The processor 103 reduces the capacity of a certain partition in accordance with the flowchart shown in FIG. 12 and then increases the capacity of the intended partition in accordance with the same flowchart.

A request for changing the capacity from the management computer 11 to the controller 101 may be issued by a program running on the management computer 11. The control program 108 may change the capacity in response to an event different from the event of the request from the management computer 11. For example, the control program 108 may change the partition's capacity automatically in response to an event that the cache hit rate of a certain cache partition has become less than a preset value. The control program 108 can change the capacity of an existing partition in the above-described new cache partition creation (refer to FIG. 11).

Next, prefetch in this embodiment will be described. If a reference (read) request issued by the host computer 10 is targeted to the data at consecutive addresses in a user data storage LU 301, the control program 108 of the storage system 100 sometimes preliminarily stages data at the subsequent address; the operation is so-called prefetch. Through the prefetch, it can be expected that sequential access performance will particularly be improved.

In this embodiment, prefetch of the control information is an effective performance improvement means. The control program 108 reads control information necessary for some operation in the storage system 100 (for example, recovery using a snapshot) from the control information storage LU 302 and stores it in the control information cache partition 220 (staging). Accompanying it, the control program 108 reads control information predicted to be necessary for subsequent steps from the control information storage LU 302 in advance and stores it in the control information cache partition 220 (staging).

For example, to restore an LU to a previous state using the snapshot management table 50 of FIG. 3, the storage system 100 sequentially refers to the difference bitmap management tables 53 for generations indicated by intended generation numbers 56 and restores the data on the pages indicating "1" in the difference bitmap 58 to the previous data.

When receiving an instruction of restoration from the management computer 11, the control program 108 preliminarily stores control information (predicted to be) necessary for the operation in the control information cache partition 220. The control program 108 may predict or learn access patterns to control information and preliminarily store control information predicted to be necessary in the control information cache partition 220.

In another example, if a program that periodically obtains a backup is working, the control program 108 may preliminarily store (stage) control information for backing-up from the control information storage LU 302 to the control information cache partition 220 prior to each backup time.

The control program 108 may carry out such prefetching control information and changing a partition's capacity in combination. For example, the control program 108 may increase a partition's capacity when a backing-up time is approaching and stage more control information for backing-up. Although repeatedly described, the prefetching control information or the changing a partition's capacity may be instructed by the storage administrator or automatically determined by the control program 108. Otherwise, the control program 108 may output a recommendation message for the storage administrator to the management computer 11.

Figure 13:
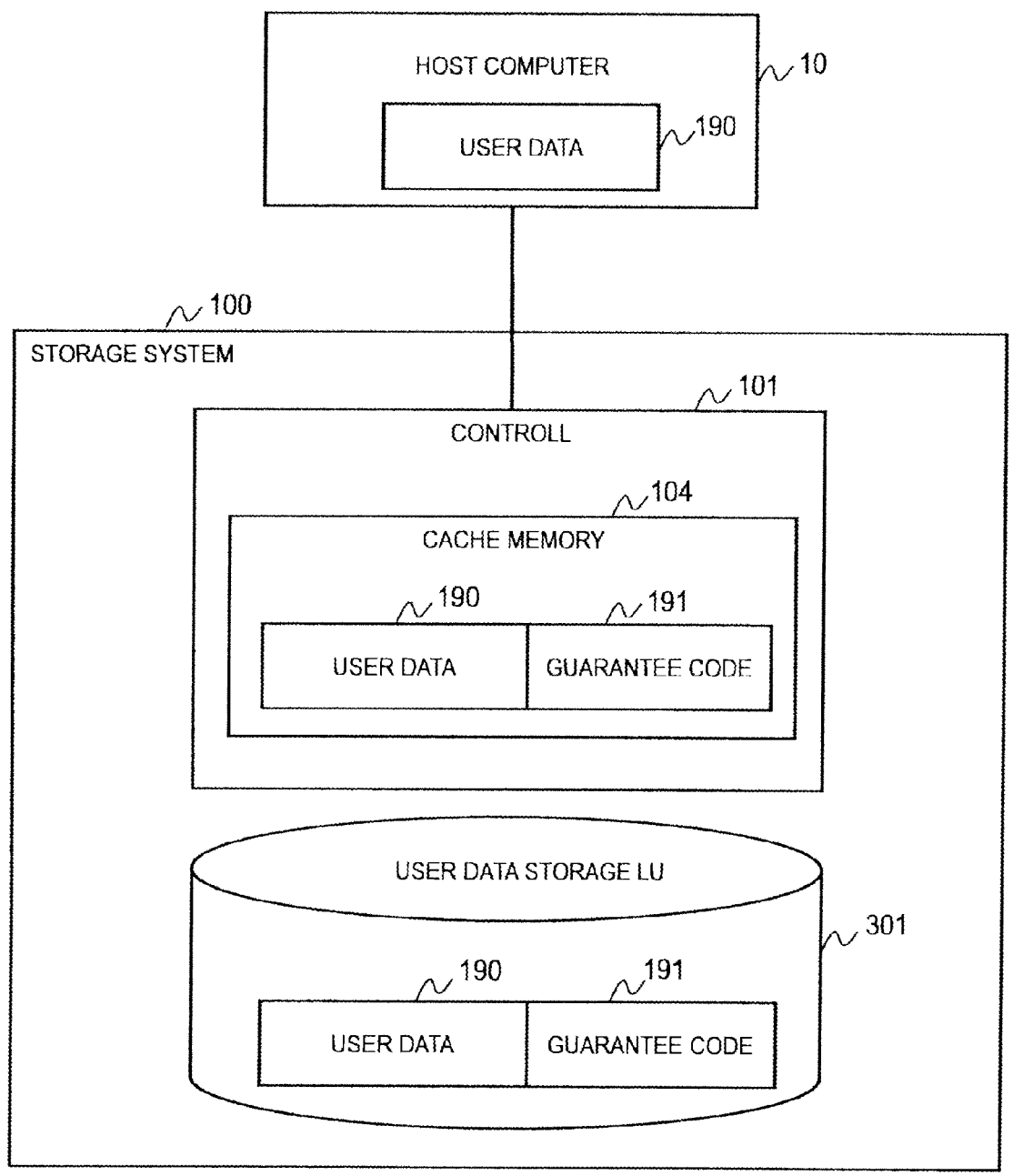
FIG. 13 is a diagram illustrating a concept of adding a guarantee code to user data in the first embodiment.

Next, addition of a guarantee code to control information in this embodiment will be described. The mechanism of the addition of a guarantee code will be briefly described with reference to FIG. 13. FIG. 13 is a block diagram illustrating a manner that a guarantee code is added to user data in the first embodiment. In a storage system 100 like in the first embodiment, user data 190 sent from the host computer 10 is once stored in the cache memory 104 and then stores in the user data storage LU 301.

Once the user data 190 is stored in the cache memory 104, the controller 101 adds a guarantee code 191 to the user data 190. The guarantee code 191 is a code for guaranteeing the authenticity of the user data 190 and applies a scheme of bit operation such as LRC (Longitudinal Redundancy Check) coding. Typically, a circuit in the controller 101 creates the guarantee code 191; the processor 103 may create it according to the control program 108.

The controller 101 refers to the guarantee code 191 in reading the user data 190 to check whether the data has been collapsed or not. Data collapse may be caused by a bug in the control program 108 or a failure in a hardware component in writing data to an LU (non-volatile storage area). The storage system 100 adds a guarantee code 191 to user data and checks it to secure the authenticity of the user data to be passed to and from the host computer 10, improving the reliability of the system.

In a preferred configuration, the controller 101 adds a guarantee code 191 to control information to store the control information in an LU. However, the control information and the user data 190 are different in the unit of amount in an update. Generally, the control program 108 refers to or updates the user data 190 in units of approximately 512 bytes.

In this case, the controller 191 creates an approximately 4-byte or 8-byte LRC code by XORing all bits in 512-byte user data, adds it to the user data, and then stores the user data in the user data storage LU 301. Namely, an approximately 4-byte or 8-byte guarantee code is added to 512-byte user data and user data having a data length of 516 bytes or 520 bytes is stored in the LU 301.

Accordingly, the smallest unit of access to a cache memory or an HDD is 516 bytes or 520 bytes. On the other hand, the control program 108 may refer to or update only several bits of control information in an operation. Processing all bits of 512-byte control information in every update of several bits includes wasteful operations to cause performance degradation of the storage system 100.

Figure 14:
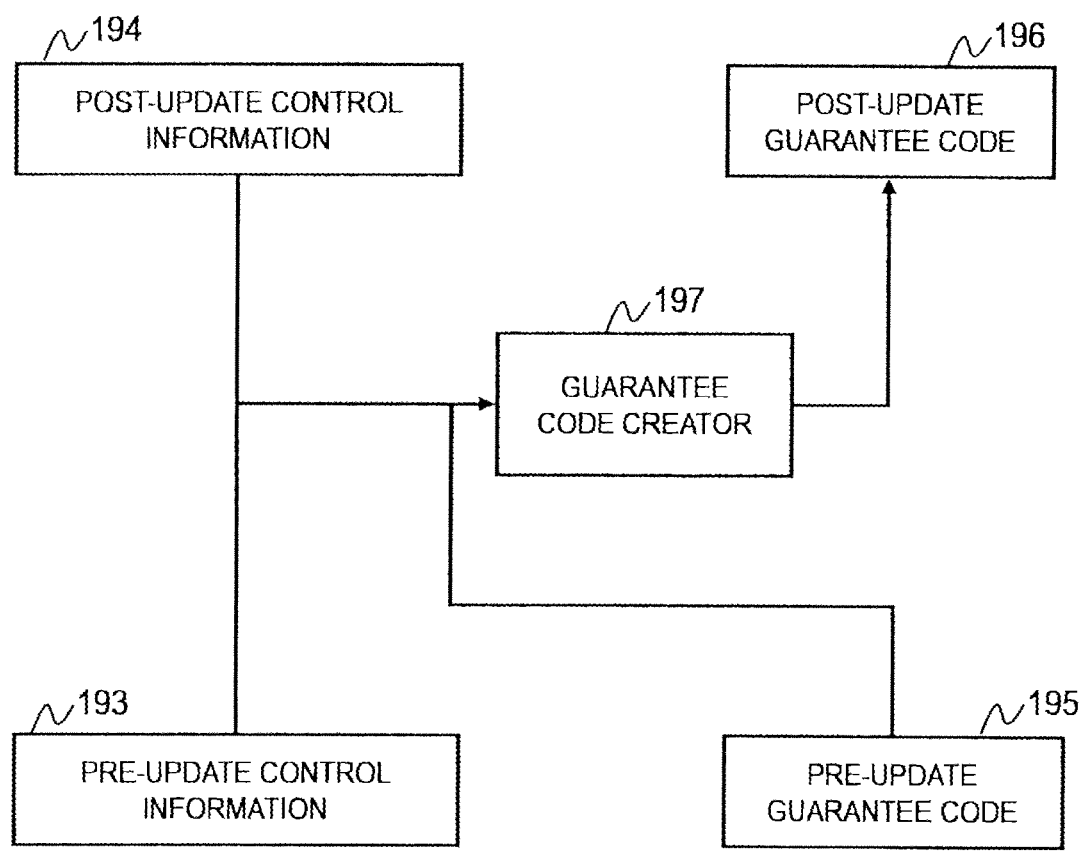
FIG. 14 is a diagram illustrating creation of a guarantee code in the first embodiment.

To solve the problem, FIG. 14 shows an effective method of creating an LRC code in updating of several bits like updating the control information. This method efficiently creates guarantee codes by LRC. First, it compares the control information prior to an update (pre-update control information 193) with the control information after the update (post-update control information 194) to select blocks including updated bit strings.

This method further creates a guarantee code after the update (a post-update guarantee code 196) using the changed block representing the deference between the selected block prior to the update and the selected block after the update and the guarantee code (pre-update guarantee code 195) accompanying the pre-update control information 193. A guarantee code creator 197 creates the post-update guarantee code 196 from the received selected block of the pre-update control information 193, the selected block of the post-update control information 194 and the pre-update guarantee code 195.

Through the method described above, a guarantee code can be created with low load in updating several bits to several bytes. The guarantee code creator 197 may be a hardware component in the controller 101 or a part of the functions of the control program 108.

As described above, the first embodiment divides the cache memory 104 of the storage system 100 into a plurality of partitions and allocates (the areas of LUs for storing) control information to one or more partitions. The storage system 100 dynamically interchanges data between the cache partitions and the LUs holding the control information to provide a large amount of usable control information and stable performance with no interference by user data operations.

Second Embodiment

Figure 15:
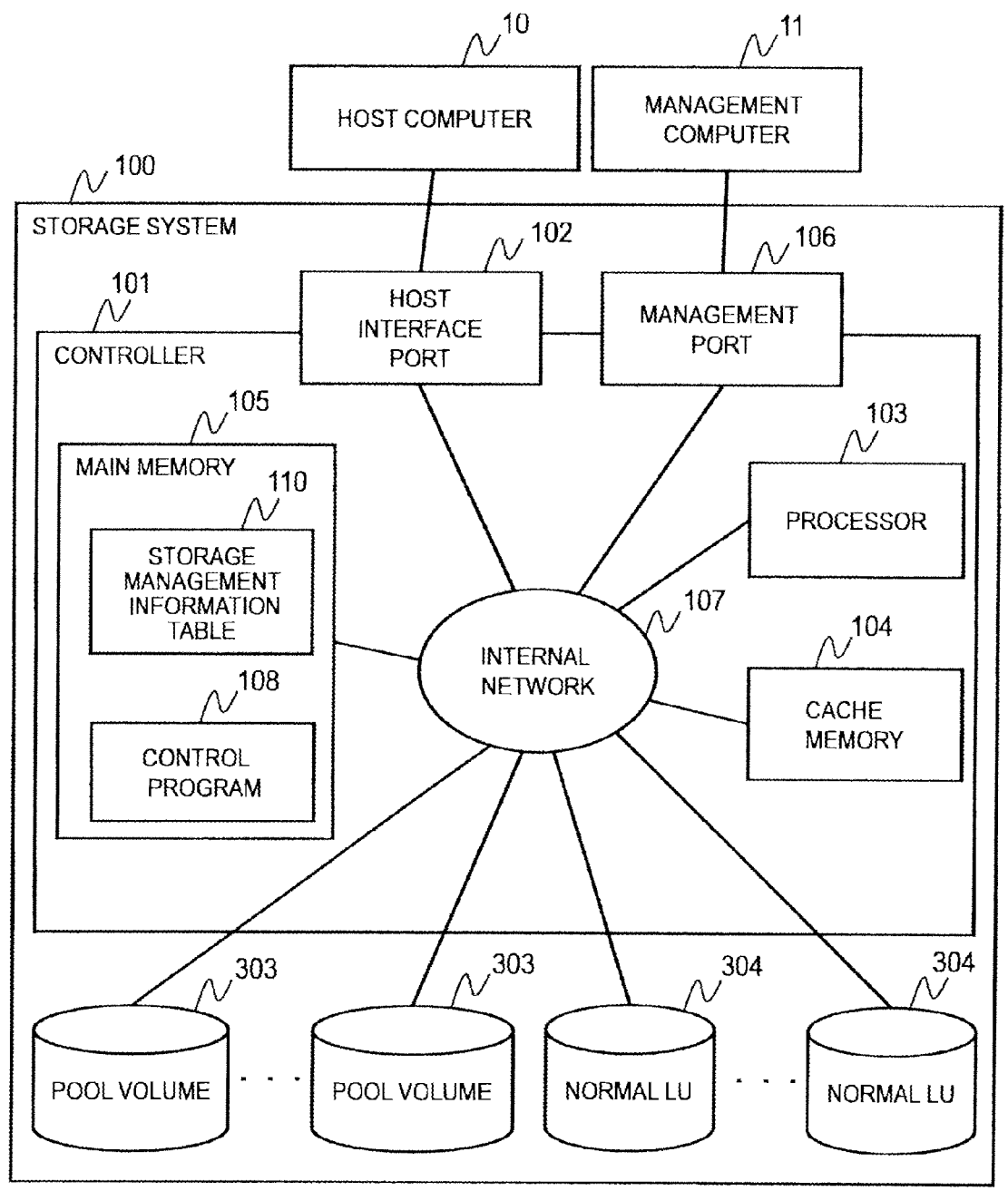
FIG. 15 is a diagram exemplifying a configuration of a storage system in a second embodiment.

Hereinafter, a second embodiment will be described with reference to FIG. 15 to FIG. 20. In this embodiment, the differences from the first embodiment will be mainly explained. FIG. 15 is a block diagram exemplifying a storage system. The storage system in FIG. 15 is different from that of the first embodiment in the point that the user data storage LUs 301 and the control information storage LUs 302 in FIG. 15 has been replaced by pool volumes 303 and normal LUs 304.

A pool volume 303 is a virtual storage area provided by a function called dynamic provisioning and is composed of a plurality of non-volatile actual areas (actual LUs) virtually regarded as a single storage area. The controller 101 can associate a pool volume 303 with a plurality of virtual LUs (virtual volumes for the host) and the storage area of a virtual LU is dynamically allocated from a pool volume 303.

In this description, a unit of storage area allocated from a pool volume 303 is called a chunk. Preferably, a plurality of chunks are not provided together for a single parity row (the unit of parity creation). Namely, a parity row is stored in a chunk.

The first embodiment writes user data to a user data storage LU 301 and control information to a control information storage LU 302. In contrast, the second embodiment writes user data and control information to a pool volume 303. In this way, the second embodiment uses storage areas in units of chunks for storing user data or control information. This configuration does not need to prepare a predetermined capacity of LUs like in the first embodiment, so that the capacity of the area to be used for storing control information can be reduced to improve the capacity efficiency of the storage system 100.

A normal LU 304 may be used together with the pool volume 303 in the second embodiment. In the second embodiment, the normal LU 304 may store control information. This option has been explained in the first embodiment and explanations on the common part will be omitted.

Figure 16:
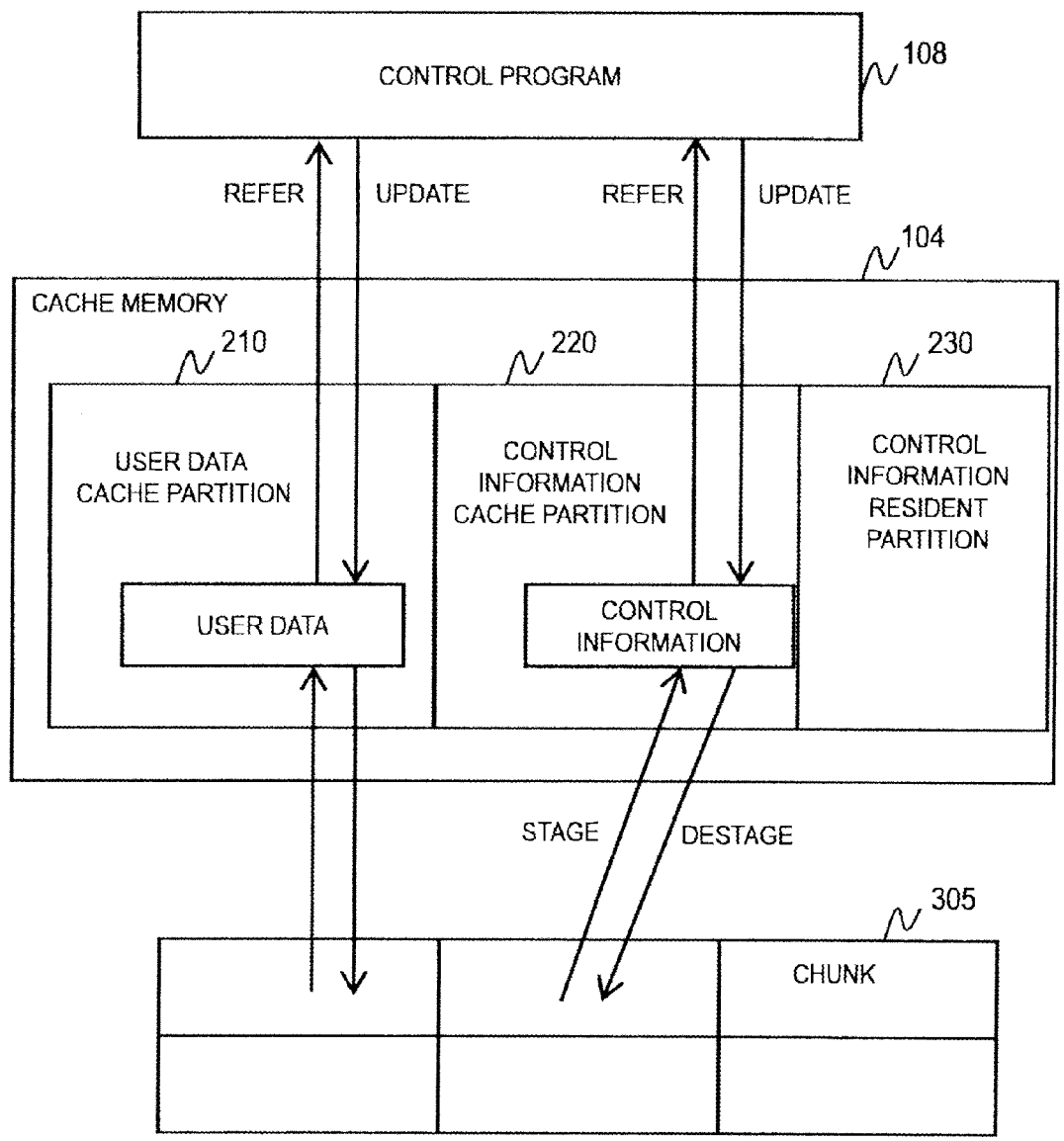
FIG. 16 is a diagram illustrating an outline of cache management in the second embodiment.

FIG. 16 is a block diagram illustrating an outline of cache management in the second embodiment. FIG. 16 illustrates a concept of storage of user data and control information in the second embodiment. It is the same as that in the first embodiment in the point that a plurality of cache partitions are provided in a cache memory 104 and a control program 108 allocates user data and control information independently to the partitions to refer to or update them. The second embodiment is different from the first embodiment in the point that the user data and the control data are stored in chunks 305.

A chunk 305 for storing control information may be allocated from the same pool volume 303 that stores user data, but for convenience of management, it is desirable that user data and control data be stored in different chunks 305.

Figure 17:
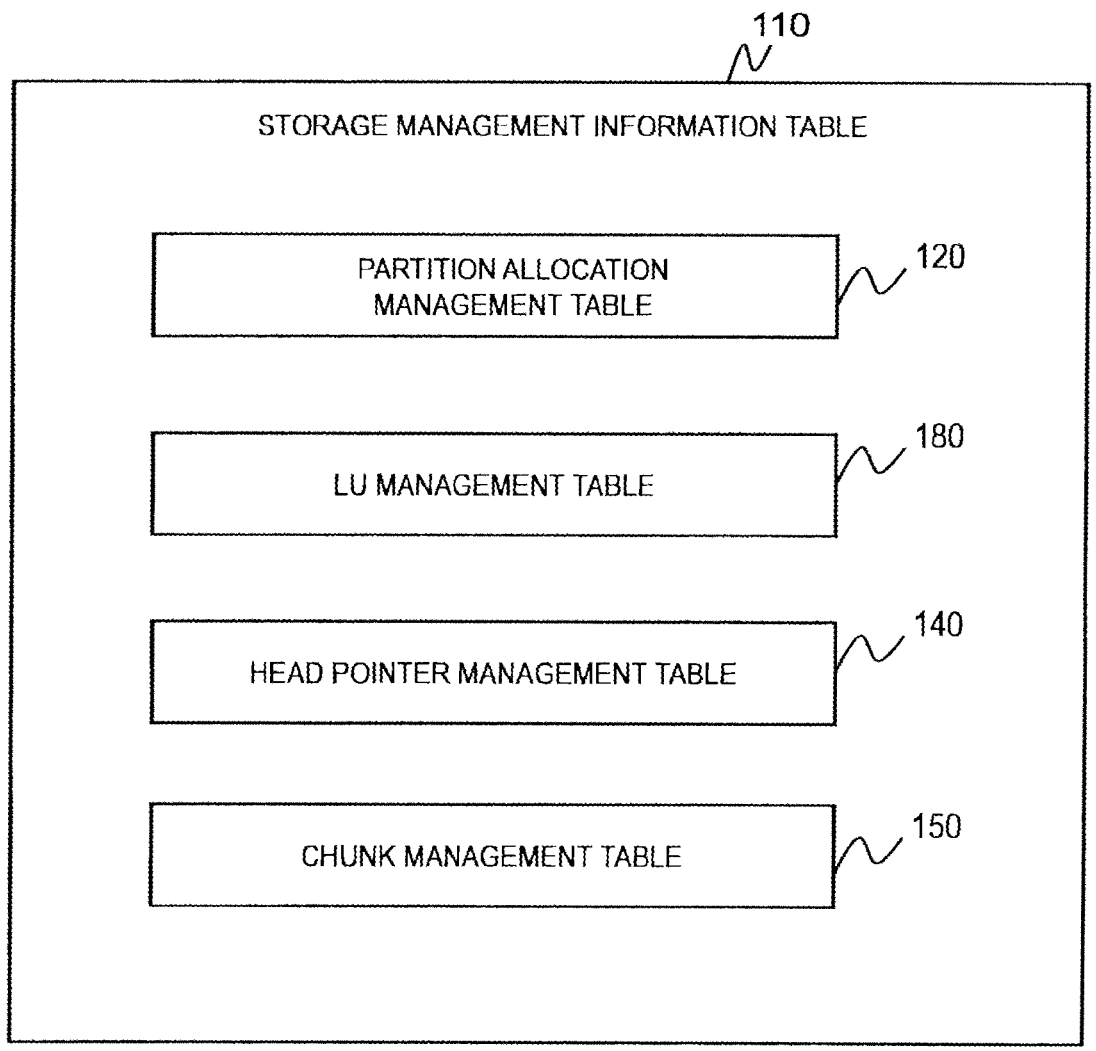
FIG. 17 is a diagram exemplifying a storage management information table in the second embodiment.

FIG. 17 illustrates a configuration example of a storage management table 110 in the second embodiment. It is different from the storage management information table 110 in the first embodiment in the point that a chunk management table 150 is added and that the LU management table 180 has a different configuration from the LU management table 130 in the first embodiment.

FIG. 18 is a configuration example of the LU management table 180 in the second embodiment. It is different from the LU management table 130 in the first embodiment in the point that the column of allocated pool number/chunk number 181 is added. In the second embodiment, virtual LUs dynamically use chunks 305 in a pool volume 303 as storage areas.

The control program 108 may allocate chunks 305 from a plurality of pool volumes 303 to a virtual LU. The control program 108 manages the pool volumes 303 and the chunks 305 forming a virtual LU with the allocated pool number/chunk number 181. To add a chunk 305 to a virtual LU, the control program 108 adds a new allocated pool number/chunk number 181.

In the second embodiment, the storage system 100 may include a normal LU 304 as well as a virtual LU. To use the normal LU 304, the field of the allocated pool number/chunk number 181 stores a value indicating "–", for example, to be distinguished from the virtual LU.

In a preferred configuration, control information stored in the control information cache partition 220 is distributed to and stored in a plurality of RAID groups in the pool volume 303. A RAID group is a group made of a plurality of data storage devices as a constituent of a RAID. If a chunk 305 is composed of storage areas in a RAID group, a plurality of chunks 305 are associated with the control information cache partition 220 to store control information to be stored in the partition 220.

In this way, a plurality of RAID groups store the control information associated with the control information cache partition 220, so that accesses to the control information not stored in the partition 220 are not be gathered onto one RAID group and delay in accessing the control information is reduced.

Although the control information is stored in a chunk 305 in the pool volume 303 in the second embodiment, if the control information for the dynamic provisioning providing the pool volume 303 is stored in the chunk 305, the chunk 305 storing the control information required by the dynamic provisioning function might not be able to be found. To prevent this problem, the control information for the dynamic provisioning function is stored in the normal LU 304, or may be stored in specific chunks only.

FIG. 19 is a block diagram exemplifying a configuration of the chunk management table 150 in the second embodiment. The chunk management table 150 is a table for managing the allocation state of chunks 305. The chunk management table 150 comprises columns of pool volume number/chunk number 181, allocated partition number 133, allocated LU number 124, free capacity 151, and stored data category 134.

A field of the pool volume number/chunk number 181 stores information for uniquely identifying a chunk 305. The value may be a combination of the number of a pool volume 303 and the number of a chunk 305. A field of the allocated partition number 133 stores the cache partition number to which the relevant chunk 305 is allocated.

If no user data or control information is allocated to a chunk 305, the chunk 305 is not allocated to a partition, either. In this case, the field of the allocated partition number 133 stores a value indicating "–", for example. A field of the allocated LU number 124 stores a value indicating the number of the virtual LU to which the relevant chunk 305 is allocated. A field of the allocated LU number 124 for a chunk 305 which is not allocated to any LU stores a value indicating "–", for example.

A field of the available space 151 stores a value indicating the remaining available space of the relevant chunk 305. A field of the stored data category 134 stores information indicating the category of the data stored in the relevant chunk 305. For example, it stores a value indicating "user data" if the chunk holds user data and stores a value indicating "control information" if it holds control information.

Figure 20:
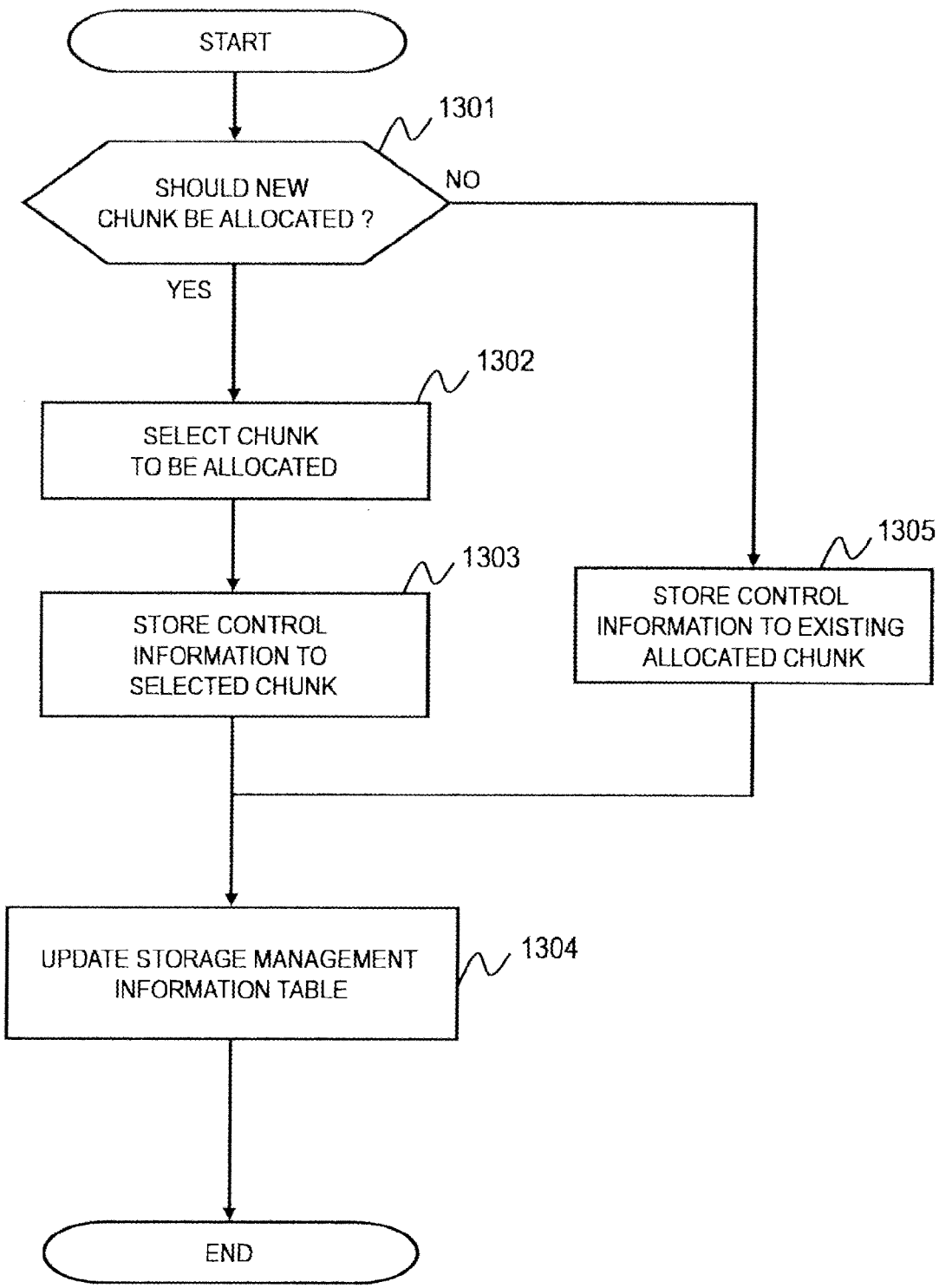
FIG. 20 is a flowchart exemplifying a procedure of allocating a chunk for storing control information in the second embodiment.

FIG. 20 is a flowchart of a procedure of allocating a chunk 305 for storing control information. The processor 103 performs the process according to the control program 108. First, the processor 103 determines whether or not a chunk 305 needs to be newly allocated to store control information (step 1301). For example, the determination compares the amount of the control information to be stored with the available space 151 in the chunk 305 which has already been allocated for storing control information and determines that a new chunk should be allocated if the available space 151 is less than the amount of the control information to be stored.

If the determination result at the step 1301 is YES, the processor 103 selects a chunk to be allocated (step 1302). It may select an unallocated chunk 305 by reference to the chunk management table 150 as the chunk 305 to be allocated or the storage manager may select it.

Next, the processor 103 stores the control information to the chunk 305 selected at the step 1302 (step 1303), updates the storage management information table 110 (step 1304), and terminates the process. If the determination result at the step 1301 is NO, the processor 103 stores the control information to the existing allocated chunk 305 without allocating a new chunk 305 (step 1305) and proceeds to the step 1304.

Third Embodiment

Figure 21:
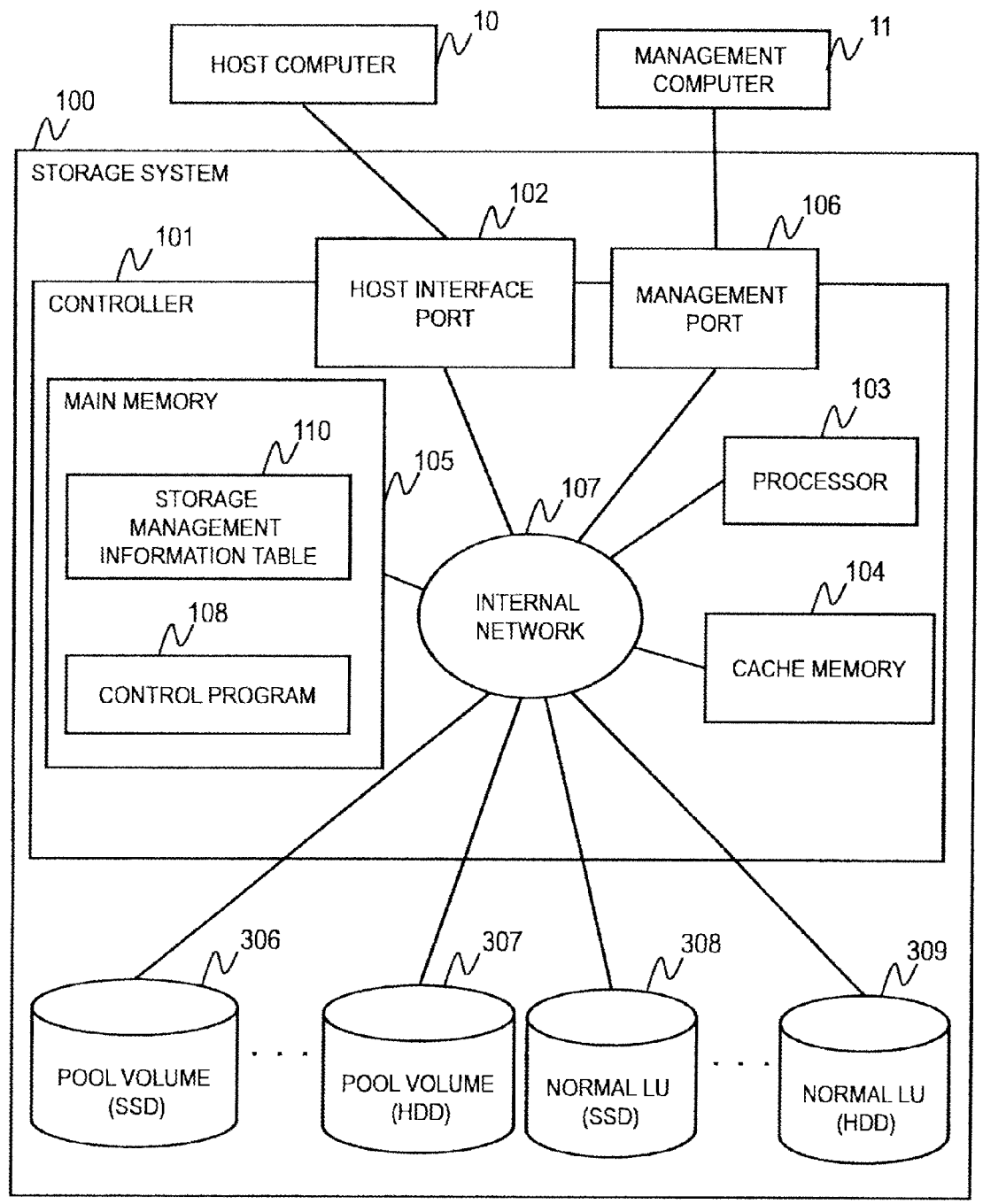
FIG. 21 is a diagram exemplifying a configuration of a storage system in a third embodiment.

Hereinafter, a third embodiment will be described with reference to FIG. 21 to FIG. 24. In this embodiment, the differences from the first embodiment and the second embodiment will be mainly explained. FIG. 21 is a block diagram exemplifying a storage system. The storage system in this embodiment is different from those in the first and the second embodiments in the point that the storage system comprises pool volumes 306 and 307 and normal LUs 308 and 309 of a plurality of types of data storage devices such as HDDs and SSDs.

The storage system comprises a plurality of types of non-volatile storage devices such as HDDs and SSDs and categorizes user data to be stored in accordance with the characteristics of the devices. User data requiring high access performance is stored in an SSD having high access speed (high access performance) to improve the access performance of the storage system 100. User data referred to with lower frequency is stored in an HDD which has lower access performance but is inexpensive per bit to reduce the cost of the storage system 100.

Hereinafter, a storage system 100 comprising two types of data storage devices of HDDs and SSDs will be described, but the types of the data storage devices having different access performances are not limited to these.

In FIG. 21, a pool volume (SSD) 306 is a pool volume 303 composed of SSDs. A pool volume (HDD) 307 is a pool volume 303 composed of HDDs. Similarly, a normal LU (SSD) 308 is a normal LU 304 composed of SSDs. A normal LU (HDD) 308 is a normal LU 304 composed of HDDs.

FIG. 22 is a block diagram exemplifying an LU management table 160 in the third embodiment. In the LU management table 160 in the third embodiment, the columns of medium type 161 and associated user data LU number 162 are added to the LU management table 130 in the second embodiment.

A field of the medium type 161 stores a value indicating "SSD" if the relevant LU is composed of storage areas of SSDs or a value indicating "HDD" if it is composed of storage areas of HDDs. If an area of the pool volume (SSD) 306 is allocated to the relevant LU, the field stores the value indicating "SSD". If an area of the pool volume (HDD) 307 is allocated to the relevant LU, it stores the value indicating "HDD".

A field of the associated user data LU number 162 indicates, if the relevant LU holds control information, which LU holds the user data the control information relates to. For example, if the control information for the user data in the LU of LU number 0 is held in the LU of LU number 10, the field of the associated user data LU number 162 in the record of the LU number 10 stores "0". The field of the associated user data LU number 162 may store values indicating a plurality of LU numbers.

Like in the third embodiment, a storage system 100 using a plurality of types of non-volatile storage devices is required to choose a proper type of non-volatile storage devices for storing a piece of control information. For example, user data requiring high access performance is stored in a high-speed SSD. If the control information required for the access to the user data is stored in a low-speed HDD, an access to the HDD occurs in an access to the control information so that the access performance to the user data stored in the SSD might be unfavorably reduced to the level of the low-speed HDD.

To prevent this problem, it should be considered that the control information associated to some user data is to be stored in a data storage device having access performance at least equal to or higher than the data storage device holding the user data. The storage administrator may select such a data storage device to store the control information or the controller 101 may automatically select a storage location for storing the control information.

Figure 23:
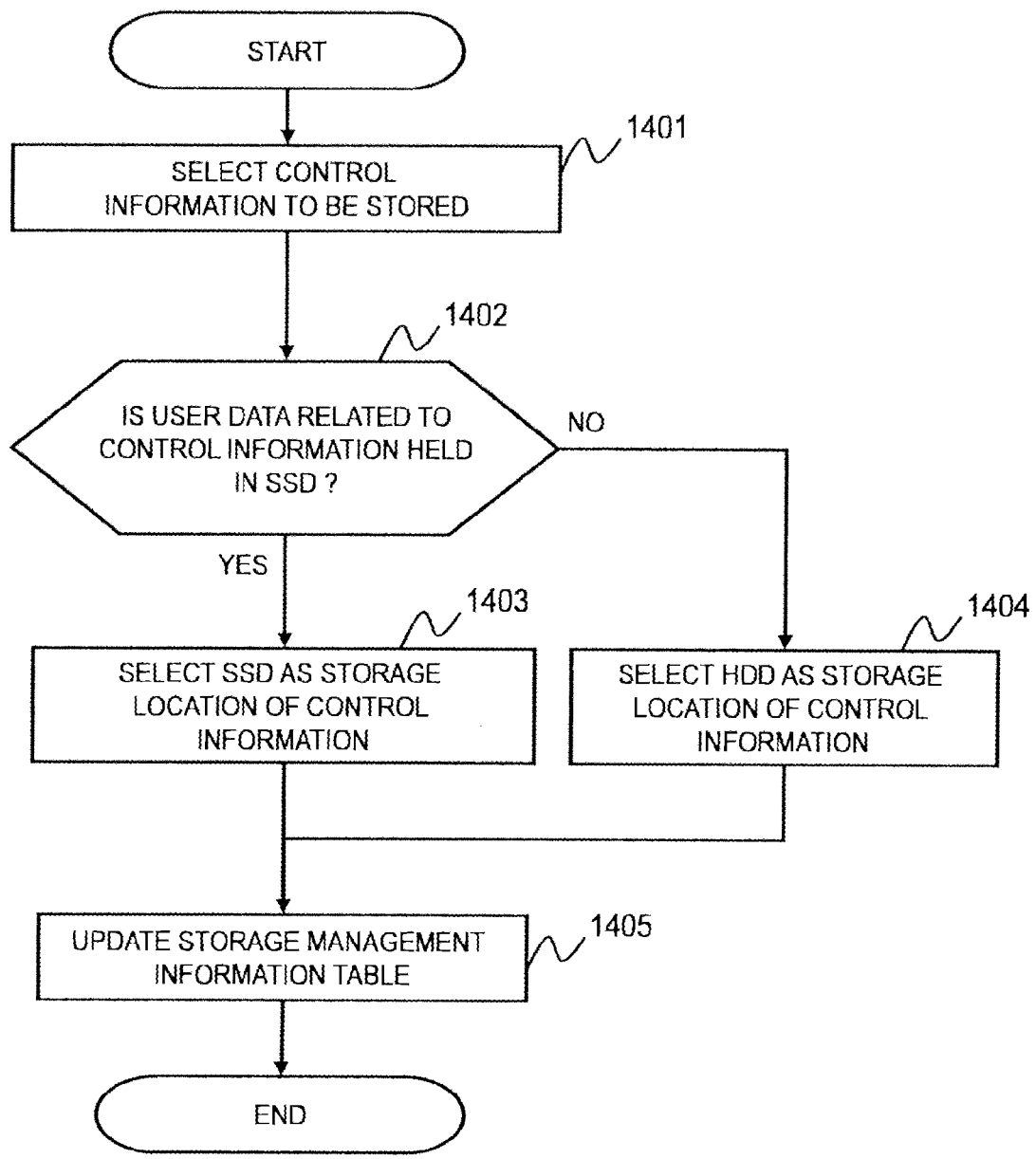
FIG. 23 is a flowchart exemplifying a procedure of selecting a storage location of control information in the third embodiment.

Hereinafter, a flowchart of a procedure that the controller 101 automatically selects a storage location for storing the control information will de explained with reference to FIG. 23. FIG. 23 is a flowchart exemplifying a procedure of selecting a storage location of control information in the third embodiment. The processor 103 performs the process according to the control program 108.

First, the processor 103 selects control information to be stored in a non-volatile storage area (step 1401). Next, the processor 103 determines whether the user data involved by the control information and selected at the step 1401 is held in an SSD or not (step 1402). In the determination, the processor 103 refers to the associated user data LU number 162 in the LU management table 160, and then refers to the medium type 161.

If the determination result at the step 1402 is YES, the processor 103 selects an LU composed of storage areas of SSDs or a chunk in a pool volume composed of storage areas of SSDs as the storage location of the control information (step 1403). If the determination result at the step 1402 is NO, the processor 103 selects an LU composed of storage areas of HDDs or a chunk of a pool volume composed of storage areas of HDDs as the storage location of the control information (step 1404). At the end, the processor 103 updates the storage management information table 110 (step 1405) to terminate the process.

This process may be started at the start of the previously described synchronous destaging or the asynchronous destaging. Since the storage location of user data may be changed by the user, the administrator, or the controller 101, the control program 108 may start this process in response to the change of the storage location of user data as a trigger. The control program 108 may periodically check the storage locations of user data and control information in the partitions, and if their storage locations are different, it can automatically start this process.

In a preferred configuration, the control program 108 defines specific control information as data to be swapped with higher priority in accordance with a predetermined priority level depending on the device type of the storage location of the user data relating to the control information. For example, between the control information associated with user data stored in a high-performance SSD and the control information associated with user data stored in a lower-performance HDD, the latter is defined as data to be swapped with higher priority than the former. When the control program 108 defines data as data to be swapped, it may delete the data or change entries in queues (change clean segments to free segments, for example) to change the state of the data.

The control information associated with user data stored in a higher-performance SSD should be kept in the cache memory as long as possible, so that the access performance to user data stored in an SSD can be prevented from being degraded by accessing the control information therefor.

Figure 24:
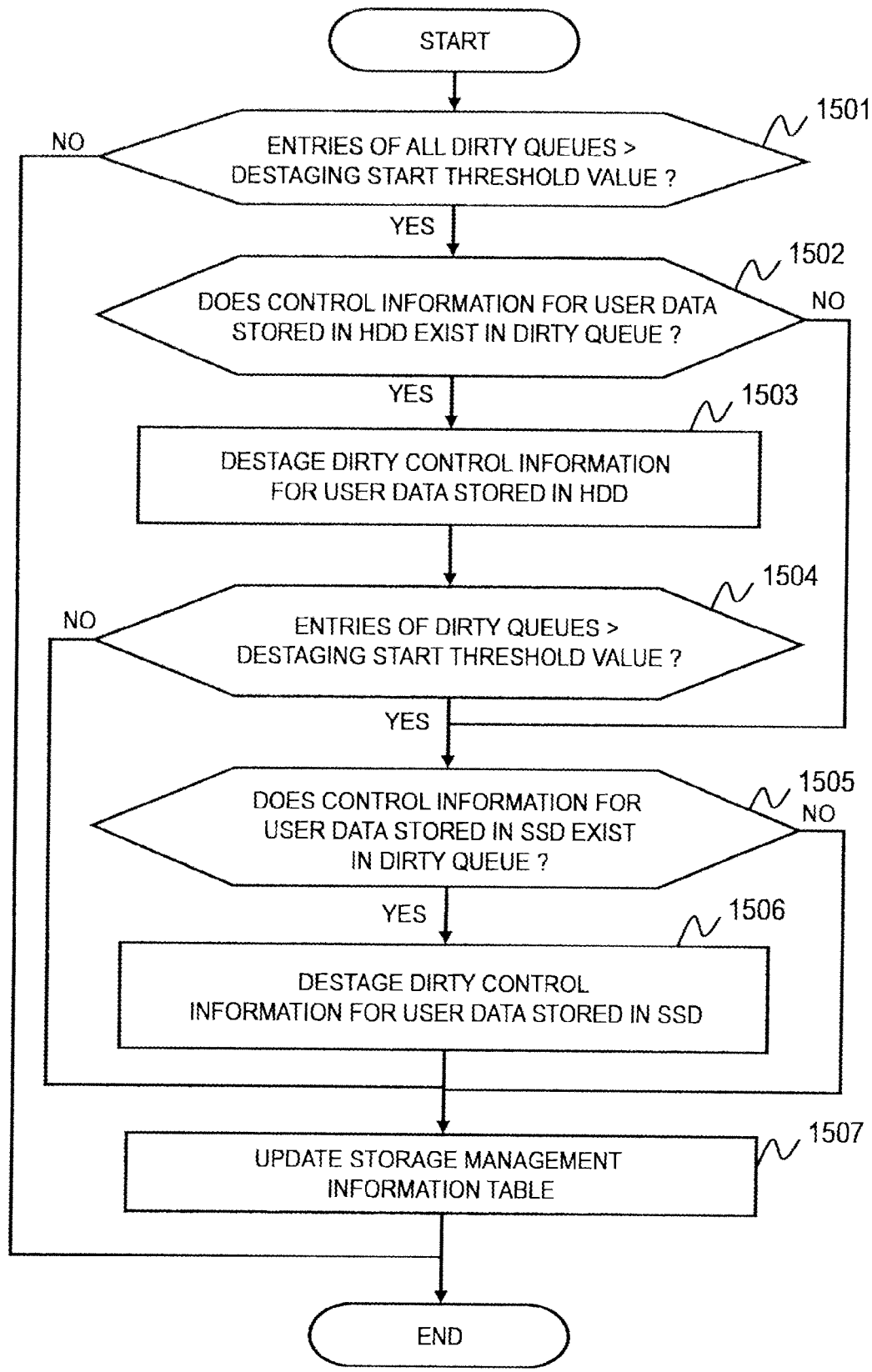
FIG. 24 is a flowchart of a procedure of destaging control information in the third embodiment.

FIG. 24 is a flowchart of a procedure of swapping so that the control information for user data stored in an SSD is kept in the cache memory 104 with higher priority. Hereinafter, a configuration example will be explained which has dirty queues for the control information for user data stored in an SSD and the control information for user data stored in an HDD in a partition, respectively. The processor 103 performs this process according to the control program 108. First, the processor 103 counts the entries existing in all dirty queues and compares the count value with a threshold value for the start of destaging (step 1501). The destaging start threshold value is a threshold value of the criterion in determining the start of destaging and is the total number of data in the dirty state or pieces of control information in the dirty state in partitions.

In a typical storage system, user data and control information in the dirty state has not been reflected to a non-volatile storage medium. Accordingly, if the power to the cache memory 104 is shut down, they will be lost. For this reason, when a certain amount of dirty user data or control information is pooled in the cache memory 104, the processor 103 proactively starts reflection, so-called destaging, to a non-volatile storage medium.

If the determination result at the step 1501 is NO, the processor 103 terminates the process. If the determination result at the step 1501 is YES, the processor 103 determines whether the control information for the user data stored in HDDs exists in the dirty queue (step 1502). If the determination result at the step 1502 is NO, it proceeds to step 1505, which will be described later. If the determination result at the step 1502 is YES, the processor 103 reflects the control information in the dirty state associated with the user data stored in HDDs to a non-volatile storage area (destaging) (step 1503).

Next, the processor 103 counts the entries existing in the dirty queues again and compares the count value with the destaging start threshold value (step 1504). If the determination result at the step 1504 is NO, the processor 103 updates the storage management information table 110 (step 1507) to terminate the process. If the determination result at the step 1504 is YES, the processor 103 determines whether the control information for the user data stored in SSDs exists in the dirty queue (step 1505).

If the determination result at the step 1505 is NO, the processor 103 proceeds to the step 1507. If the determination result at the step 1505 is YES, the processor 103 reflects the control information in the dirty state for the user data stored in SSDs to the non-volatile storage area (destaging). At the end, the processor 103 proceeds to the step 1507 to terminate the process. This process may be started at a synchronous destaging or an asynchronous destaging.

As explained with reference to FIG. 8, the control program 108 writes new data from the non-volatile storage area to free segments (staging). Moreover, if the number of free segments is less than a predetermined number, the control program 108 changes clean segments into free segments. The above-described process destages the control information for the user data stored in HDDs with higher priority than the control information for the user data stored in SSDs.

Through the process, the control information for the user data stored in SSDs can be kept dirty with higher priority and held in the cache memory 104 with higher priority. Although this process destages dirty segments in accordance with the priority level, the control program 108 may select clean segments to be reset to free segments in accordance with the priority level. For example, it changes segments of the control information for the user data stored in HDDs into free segments with higher priority than the segments of the control information for the user data stored in SSDs.

In the third embodiment, two types of medium, SSD and HDD, have been exemplified as the type of medium employed in the storage system 100. However, more types of data storage device may be employed. For example, the SSD may be divided into different types of flash memory such as SLC (Single Level Cell) and MLC (Multiple Level Cell).

The HDD may be divided depending on the type of interface such as SAS and SATA, or tape devices may be included in the system. Even if more types of medium are employed, the controller 101 or the processor 103 may automatically determine the medium type for storing user data and control data.

Fourth Embodiment

Figure 25:
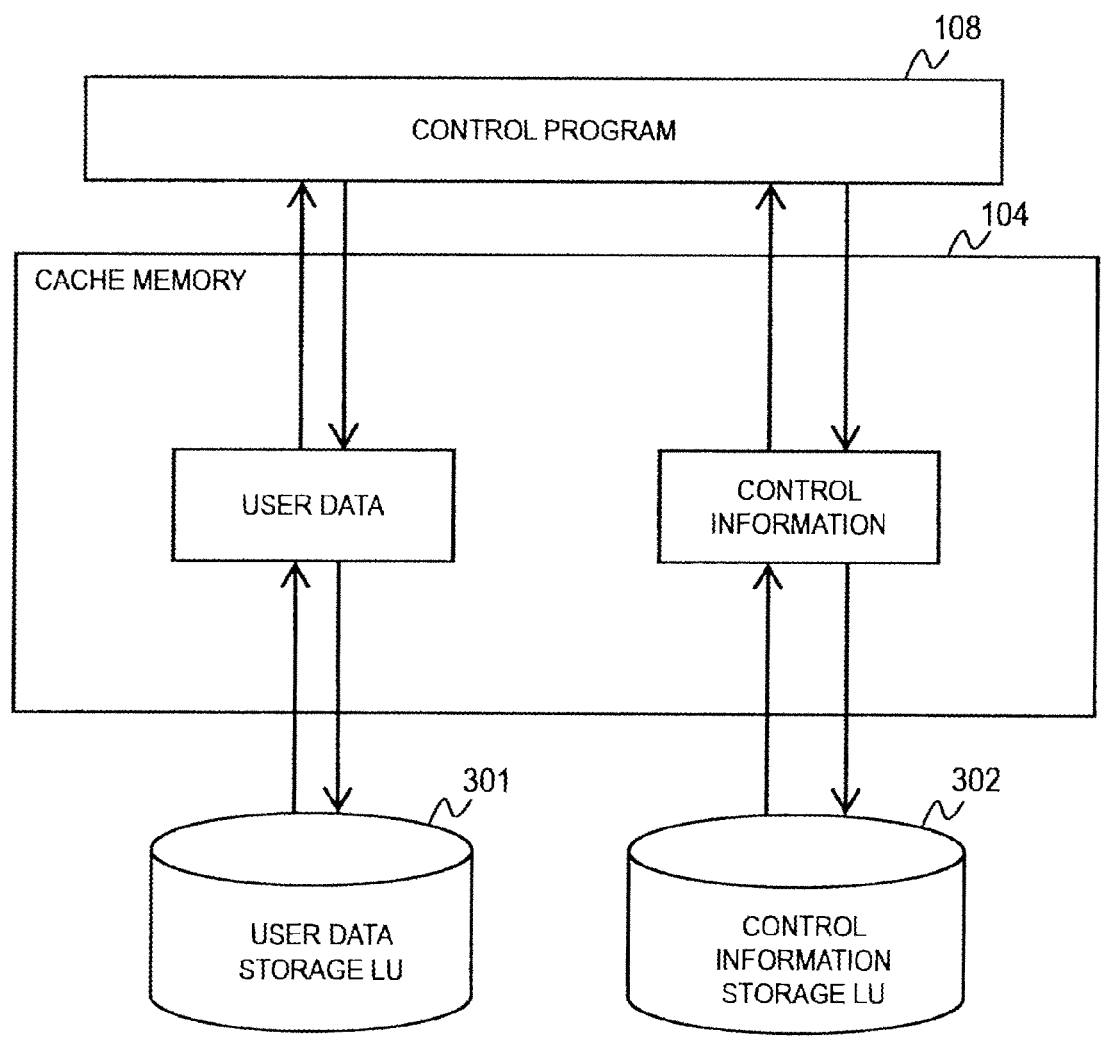
FIG. 25 is a diagram illustrating an outline of cache management in a fourth embodiment.

FIG. 25 is a diagram illustrating an outline of cache management in a fourth embodiment. It is different from those in the first, second, and third embodiments in the point that user data and control information are included in the same partition of the cache memory 104. This embodiment can be applied to a cache memory 104 having cache partitions. For example, in a configuration in which a user data cache partition 210 stores control data as well as user data, this embodiment can be applied to the user data cache partition 210.

Hereinafter, an example of a storage system 100 will be explained in which the cache memory 104 have neither partitions 220 nor 230 for control information. As shown in FIG. 25, the cache memory 104 stores user data and control information in the same area.

A controller 101 in this embodiment provides user data and control information with their respective LRU queues and sets different priorities on the queues for LRU management. It is the same as in the above-described other embodiments in the point that the storage system 100 may use different algorithms from LRU.

FIG. 26 is a block diagram exemplifying a head pointer management table 140 in the fourth embodiment. The head pointer management table 140 shown in FIG. 26 comprises the column of control information flag 146 in addition to the configuration of the head pointer management table 140 in the first, second, and third embodiments.

The control information flag 146 is a flag for indicating whether the queues to be managed by a pointer list 141 is of user data or of control information. For example, a pointer list 141 with the control information flag of "1" is for queues in LRU management of control data. On the other hand, a pointer list 141 with the control information flag of "0" is for queues in LRU management of user data.

Distinguishing the management target of queues between control information and user data and starting destaging from the queue LRU managing user data at a synchronous destaging or an asynchronous destaging allow control information to be kept in the cache memory 104 with higher priority.

As to the unit of data in an access by the storage system, control information is much smaller than user data in the unit of access data, as previously described. That is to say, the cache memory amount necessary for an access to control information is smaller than that to user data. For this reason, defining user data using more cache memory as data to be swapped first allows more control information to stay in the cache memory. Through this configuration, the cache hit rate of control information increases to preserve the access performance to control information.

Figure 27:
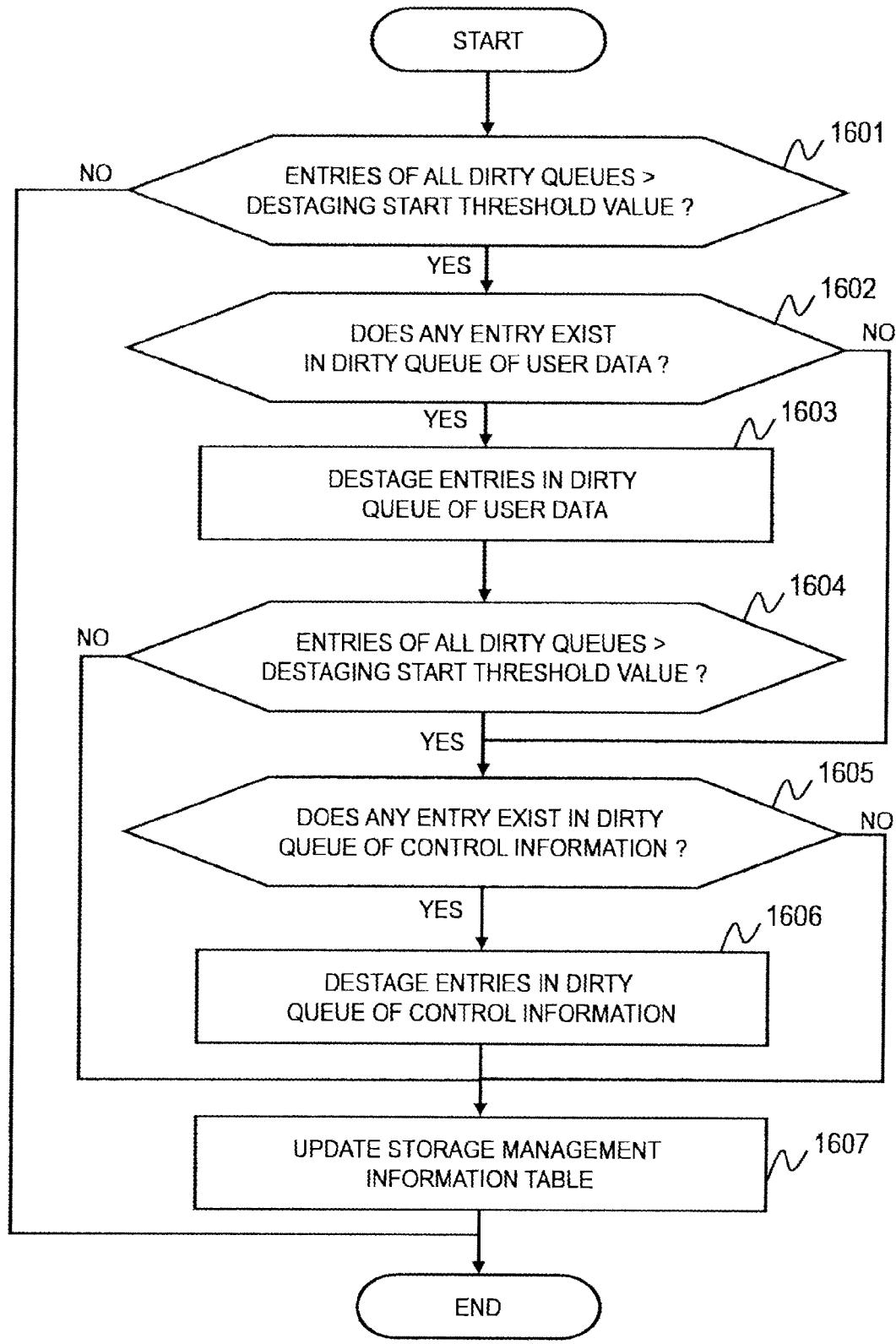
FIG. 27 is a flowchart of a procedure of destaging in the fourth embodiment.

FIG. 27 is a flowchart of a procedure of keeping control information in the cache memory 104 with higher priority than user data in the fourth embodiment. The processor 103 performs this process according to the control program 108. First, the processor 103 counts the entries existing in all dirty queues and compares the count value with a destaging start threshold value (step 1601).

If the determination result at the step 1601 is NO, the processor terminates the process. If the determination result at the step 1601 is YES, the processor 103 determines whether any entry exists in the dirty queue in the pointer list 141 with the control information flag of "0", or the pointer list 141 managing user data (step 1602).

If the determination result at the step 1602 is NO, the processor 103 proceeds to later-described step 1605. If the determination result at the step 1602 is YES, the processor 103 destages the entries in the dirty queue managing user data, or dirty user data (step 1603).

Next, the processor 103 counts entries in the dirty queues again and compares the count value with the destaging start threshold value (step 1604). If the determination result at the step 1604 is NO, the processor 103 updates the storage management information table 110 (step 1607) to terminate the process. If the determination result at the step 1604 is YES, the processor 103 determines whether any entry exists in the dirty queue in the pointer list 141 with the control information flag of "1", or the pointer list 141 managing control information (step 1605).

If the determination result at the step 1605 is NO, the processor 103 proceeds to the step 1607. If the determination result at the step 1605 is YES, the processor 103 destages the entries in the dirty queue managing control information, or dirty control information (step 1606). At the end, the processor 103 proceeds to the step 1607 to terminate the process.

As described above, this process places higher priority to destaging user data than destaging control information. Through this process, the segments of user data changes into clean prior to the segments of control information. As described with reference to FIG. 24, control information can be stayed in the cache memory 104 with higher priority than user data.

In the above-described process, destaging of dirty segments is performed in accordance with the priority level, but the control program 108 selects clean segments to be reset into free segments in accordance with the priority level. The control program 108 resets clean segments of user data into free segments with higher priority than clean segments of control information.

In the above-described process, the sizes of the queue of user data and the queue of control data may be preliminarily defined. The control program 108 dynamically changes the sizes of queues to improve the performance of the storage system 100 depending on the access pattern from the host. For example, the control program 108 may temporarily increase the size of queue of control information to create a large number of snapshots or change the size of queue synchronously with a prefetch, which was described in the first embodiment.

As set forth above, this invention has been explained in detail with reference to the accompanying drawings, but is not limited to these specific configurations and includes various modifications and equivalent configurations within the scope of the claims attached hereto. For example, the storage system of this invention may comprise only a part of the components in the embodiments and may comprise components other than those in the embodiments.

A program is executed by a processor to perform predetermined processes using a memory and a port. The explanations provided by the sentences having the control program 108 as the subject in the above-described embodiments can be substituted by the ones having the processor 103 as the subject. The processes executed by the program are the processes executed by the controller 101 on which the program runs, or the processes executed by the storage system 100.

At least a part of the control program 108 may be provided by dedicated hardware in the controller 101. The program can be installed to apparatuses with a program distribution server or a persistent computer-readable storage medium and stored in non-volatile storage areas in the apparatuses.

Although the above-described embodiments each exemplify a storage system 100 comprised of a single apparatus and a host computer 10 for clarity of explanation, this invention is applicable to a system comprised of a plurality of storage subsystem and a plurality of host computers.

Although the above-described embodiments each exemplify a controller 101 including a processor 103, the controller may include a plurality of processors and the processes by the processor 103 may be performed by the plurality of processors. Although the above-described embodiments each exemplify a management computer 11, the system of this invention may include a plurality of management computers. One of them may be a computer of display use and a plurality of computers may perform the processes equivalent to those by the management computer 11. A storage system may be equipped with constituents described in the different embodiments. A part of the constituents in the storage system described in each embodiment may be omitted.

REFERENCE SIGNS LIST

10 Host computer
11 Management computer
100 Storage system
101 Controller
102 Host interface port
103 Processor
104 Cache memory
105 Main memory
106 Management port
107 Internal network
210 User data cache partition
220 Control information cache partition
230 Control information resident partition
301 User data storage LU
302 Control information storage LU
303 Pool volume
304 Normal LU
305 Chunk
306 Pool volume (SSD)
307 Pool volume (HDD)
308 Normal LU (SSD)
309 Normal LU (HDD)

The invention claimed is:

1. A storage system coupled to a host computer, comprising:
a controller;
a cache memory; and
a plurality of storage devices configured to provide a pool volume,
wherein the controller is configured to manage a plurality of chunks in the pool volume,
wherein the controller is configured to provide a virtual volume to the host computer,
wherein, in response to a write request of user data from the host computer, the controller is configured to allocate one or more chunks of the plurality of chunks from the pool volume to a part of the virtual volume for the user data, and
wherein, in generating control information, the controller is configured to allocate another chunk for storing the control information, from the pool volume, in which the another chunk is different from the one or more chunks allocated for the user data.

2. The storage system according to claim 1,
wherein the storage devices are configured to include a plurality of hard disk drives (HDDs) and a plurality of solid state drives (SSDs),
wherein the control information is configured to include first control information for the user data stored in at least one of the HDDs and second control information for the user data stored in at least one of the SSDs, and
wherein the controller is configured to destage the first control information from the cache memory to at least one of the HDDs.

3. The storage system according to claim 2, wherein the cache memory is configured to provide a first cache partition for storing the user data received from the host computer and a second cache partition for storing the control information used to perform a function of the storage system.

4. The storage system according to claim 3, wherein the second cache partition is configured to comprise:
an area for caching a part of the control information; and
an area for storing resident control information.

5. The storage system according to claim 2,
wherein the controller is configured to destage the second control information from the cache memory to at least one of the SSDs.

6. The storage system according to claim 2,
wherein the controller is configured to prioritize destaging the first control information from the cache memory to at least one of the HDDs.

7. The storage system according to claim 2,
wherein the controller is configured to manage control information related to a snapshot function to remain in the cache memory.

8. The storage system according to claim 2,
wherein the controller is configured to manage control information related to a dynamic provisioning function to remain in the cache memory.

9. The storage system according to claim 1,
wherein the controller is configured to determine an amount of the control information and to allocate a new unallocated chunk from the pool volume, when an available amount of storage space in the allocated chunk is less than the amount of the control information.

10. The storage system according to claim 1,
wherein the controller is configured to manage each chunk in the pool volume by an identifier of the user data or the control information.

11. A method of a storage system which is coupled to a host computer, the storage system comprises a controller, a cache memory, and a plurality of storage devices configured to provide a pool volume, the method comprising:
managing, by the controller, a plurality of chunks in the pool volume;
providing, by the controller, a virtual volume to the host computer;
allocating, by the controller, in response to a write request of user data from the host computer, one or more chunks of the plurality of chunks from the pool volume to a part of the virtual volume for the user data; and
allocating, by the controller, in generating control information, another chunk for storing the control information, from the pool volume, in which the another chunk is different from the one or more chunks allocated for the user data.

12. The method according to claim 11, wherein the storage devices are configured to include a plurality of hard disk drives (HDDs) and a plurality of solid state drives (SSDs), and the control information is configured to include first control information for the user data stored in at least one of the HDDs and second control information for the user data stored in at least one of the SSDs, and further comprising:
destaging, by the controller, the first control information from the cache memory to at least one of the HDDs.

13. The method according to claim 12, wherein the cache memory is configured to provide a first cache partition for storing the user data received from the host computer and a second cache partition for storing the control information used to perform a function of the storage system.

14. The method according to claim 13, further comprising:
caching a part of the control information in a first part of the second cache partition; and
storing resident control information in a second part of the second cache partition.

15. The method according to claim 12, further comprising:
destaging, by the controller, the second control information from the cache memory to at least one of the SSDs.

16. The method according to claim 12, further comprising:
prioritizing, by the controller, destaging the first control information from the cache memory to at least one of the HDDs.

17. The method according to claim 12, further comprising:
managing, by the controller, control information related to a snapshot function to remain in the cache memory.

18. The method according to claim 12, further comprising:
managing, by the controller, control information related to a dynamic provisioning function to remain in the cache memory.

19. The method according to claim 11, further comprising:
determining an amount of the control information and allocating a new unallocated chunk from the pool volume, when an available amount of storage space in the allocated chunk is less than the amount of the control information.

20. The method according to claim 11, further comprising:
managing, by the controller, each chunk in the pool volume by an identifier of the user data or the control information.

* * * * *